US012769557B2

(12) United States Patent
Samuel et al.

(10) Patent No.: US 12,769,557 B2
(45) Date of Patent: Oct. 20, 2026

(54) SYSTEM AND METHOD OF ARTIFICIAL INTELLIGENCE PRODUCTIVITY TOOL REBOOTING OPERATING SYSTEM AND INITIALIZING SECURE HARDWARE COMPONENT DURING PRE-BOOT IN RESPONSE TO USER QUERY INPUT

(71) Applicant: Dell Products LP, Round Rock, TX (US)

(72) Inventors: Balasingh Ponraj Samuel, Round Rock, TX (US); Srikanth Kondapi, Austin, TX (US); Daniel L. Hamlin, Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 80 days.

(21) Appl. No.: 18/930,683

(22) Filed: Oct. 29, 2024

(65) Prior Publication Data

US 2026/0119184 A1 Apr. 30, 2026

(51) Int. Cl.
*G06F 9/4401* (2018.01)

(52) U.S. Cl.
CPC .................................. *G06F 9/4401* (2013.01)

(58) Field of Classification Search
None
See application file for complete search history.

(56) References Cited

U.S. PATENT DOCUMENTS

| | | | |
|---|---|---|---|
| 8,380,714 | B2 | 2/2013 | Inagaki |
| 8,548,951 | B2 | 10/2013 | Solmer |
| 9,201,957 | B2 | 12/2015 | Turdakov |
| 9,218,412 | B2 | 12/2015 | Wang |
| 9,626,358 | B2 | 4/2017 | Danielyan |
| 9,633,085 | B2 | 4/2017 | Kamotsky |

(Continued)

FOREIGN PATENT DOCUMENTS

| | | | |
|---|---|---|---|
| WO | 2020/192587 | A1 | 10/2020 |
| WO | 2021/050382 | A1 | 3/2021 |
| WO | 2023/249666 | A1 | 12/2023 |

*Primary Examiner* — Kim Huynh

(74) *Attorney, Agent, or Firm* — Prol Intellectual Property Law, PLLC; H. Kenneth Prol

(57) ABSTRACT

An information handling system managed by an enterprise management system and operating an on-the-box artificial intelligence productivity tool may comprise a hardware processor executing machine readable code instructions to generate vectorized capability intent values from natural language descriptions of capabilities including a capability-with-reboot requiring reboot to a basic input/output system (BIOS) and a vectorized query input intent value for a user query input requesting action from information handling system, compare the query input intent value to the capability intent values to identify a best match responsive capability-with-reboot for the received user query input having a capability intent value that generates a highest semantic similarity search score and requiring authorization for execution of pre-boot machine readable code instructions for the best match capability-with-reboot received from the enterprise management system, store it in a pre-boot memory partition, reboot, and execute the best match responsive capability-with-reboot upon boot to BIOS.

20 Claims, 6 Drawing Sheets

(56) References Cited

U.S. PATENT DOCUMENTS

| | | | | |
|---|---|---|---|---|
| 9,648,683 | B2 | 5/2017 | Kangyo | |
| 10,146,593 | B2 | 12/2018 | Gong | |
| 11,620,262 | B2 | 4/2023 | Lee | |
| 11,948,073 | B2 | 4/2024 | Zhang | |
| 2018/0365065 | A1 | 12/2018 | Guttman | |
| 2020/0387550 | A1 | 12/2020 | Cappetta | |
| 2020/0394360 | A1 | 12/2020 | Dunn | |
| 2021/0216576 | A1 | 7/2021 | Staub | |
| 2021/0256207 | A1 | 8/2021 | Dunn | |
| 2021/0334194 | A1 | 10/2021 | Xiao | |
| 2021/0366506 | A1 | 11/2021 | Han | |
| 2021/0374353 | A1 | 12/2021 | Zhang | |
| 2022/0035684 | A1 | 2/2022 | Gupte | |
| 2022/0035732 | A1 | 2/2022 | Xiao | |
| 2022/0092439 | A1 | 3/2022 | Liu | |
| 2022/0318502 | A1 | 10/2022 | Howell | |
| 2022/0335131 | A1 * | 10/2022 | Vidyadhara | H04L 41/28 |
| 2023/0067647 | A1 * | 3/2023 | Samuel | G06F 9/44505 |
| 2023/0104089 | A1 * | 4/2023 | Dhanakshirur | G06F 9/4406 713/2 |
| 2023/0105806 | A1 | 4/2023 | Dunn | |
| 2023/0222359 | A1 | 7/2023 | Panikkar | |
| 2023/0237263 | A1 | 7/2023 | Howell | |
| 2023/0251962 | A1 | 8/2023 | Xiao | |
| 2023/0267374 | A1 | 8/2023 | Polleri | |
| 2023/0336340 | A1 | 10/2023 | Polleri | |
| 2023/0409277 | A1 | 12/2023 | Sharifi | |
| 2024/0007414 | A1 | 1/2024 | Jain | |
| 2024/0037346 | A1 | 2/2024 | Chorakhalikar | |
| 2024/0054318 | A1 | 2/2024 | Feltin | |
| 2024/0061719 | A1 | 2/2024 | Reddy | |
| 2024/0069770 | A1 | 2/2024 | Prabhakar | |
| 2024/0069959 | A1 | 2/2024 | Prabhakar | |
| 2024/0070113 | A1 | 2/2024 | Prabhakar | |
| 2024/0161003 | A1 | 5/2024 | Alexander | |
| 2026/0037236 | A1 * | 2/2026 | Sachdev | G06F 40/30 |

* cited by examiner

SYSTEM AND METHOD OF ARTIFICIAL INTELLIGENCE PRODUCTIVITY TOOL REBOOTING OPERATING SYSTEM AND INITIALIZING SECURE HARDWARE COMPONENT DURING PRE-BOOT IN RESPONSE TO USER QUERY INPUT

FIELD OF THE DISCLOSURE

The present disclosure generally relates to an on the box (OTB) artificial intelligence (AI) productivity tool that employs machine learning models stored at an information handling system for optimizing user productivity and information handling system performance with capability responses to user query inputs. The present disclosure more specifically relates to a hardware processor executing machine readable code instructions to identify a hardware capability in response to a user query input for execution of pre-boot machine readable code instructions for initialization of a secure hardware component managed by an enterprise management system after reboot.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more artificial intelligence (AI) productivity tool enableable software applications, chat bots, or the like. Further, the information handling system may include an on the box (OTB) artificial intelligence (AI) productivity tool employing machine learning models stored locally at the information handling system, as installed by a manufacturer of the information handling system, for optimizing user productivity and information handling system performance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
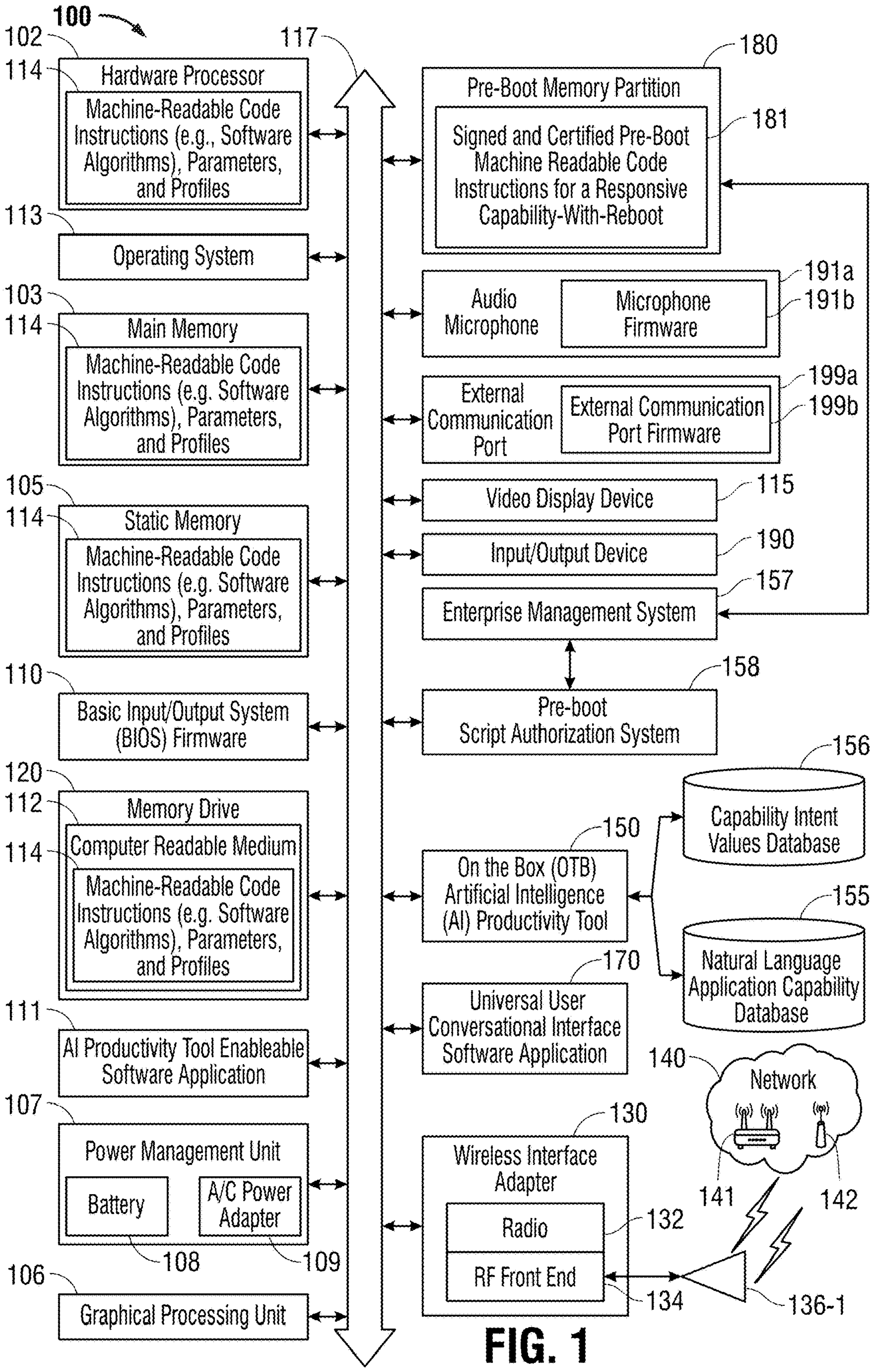
FIG. 1 is a block diagram illustrating an information handling system executing machine readable code instructions for a pre-boot script authorization system of an on the box (OTB) artificial intelligence (AI) productivity tool for requesting, receiving, and executing pre-boot code instructions from an enterprise management system for a best match responsive capability requiring reboot according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and interactions with humans. An example of AI technologies includes, but is not limited to, chat-enabled environments (voice, text, etc.). These chat-enabled environments are described in embodiments herein as an on the box (OTB) AI productivity tool that receives this voice or text input from a user and implements a number of actions or utilizes services of various software applications based on the natural language of the input. In some information handling systems, the OTB AI productivity tool may interface with various AI productivity tool-enablable software applications being executed or executable on the information handling system at an operating system (OS) level. These AI productivity tool-enablable software applications may integrate with the OTB AI productivity tool to allow user queries to trigger certain responsive capability actions declared, supported, and managed by these AI productivity tool-enablable software applications. In embodiments herein, the OTB AI productivity tool may also trigger certain firmware or hardware capability actions at the information handling system platform level declared and supported by firmware or hardware capabilities for various hardware components of the information handling system operating at the platform level below the OS of the information handling system.

In some cases, user queries received at the OTB AI productivity tool may prompt or request responsive capabilities with a reboot requirement for functionality of hardware components for the information handling system requiring reboot of the operating system (OS) and reinitialization of those hardware components. An enterprise management system that manages the information handling system may have configured the information handling system to disable or limit functionality of the firmware or hardware components addressed in the received user query requiring reboot to a basic input/output system (BIOS). In such cases, the OTB AI productivity tool in embodiments herein may direct request and retrieval from the enterprise management system of machine readable code instructions, or a script, for execution of the responsive capability-with-reboot that requires authorization and initialization of those hardware components addressed in the user query, rebooting of the operating system, and execution of the BIOS at the platform level to initialize those hardware components and perform the responsive capability-with-reboot through execution of the received machine readable code instructions. In some embodiments, the responsive capability-with-reboot may be the execution of a hardware driver or firmware to enable access to an otherwise secured platform-specific hardware component itself at the BIOS level. In other embodiments, the responsive capability-with-reboot may be the execution of a hardware driver or firmware that requires initialization of an otherwise secured platform-specific hardware component at the BIOS level for execution of some other functionality.

A hardware processor executing code instructions of the OTB AI productivity tool in embodiments herein may receive user queries via an input/output device such as a keyboard, microphone, or video camera, described herein as user query inputs. The OTB AI productivity tool may match received user query inputs to known capabilities of firmware or hardware components registered with the OTB AI productivity tool via an available capabilities database. Some, although not necessarily all, of those known capabilities of firmware or hardware components may be designated in metadata or otherwise to require a reboot to BIOS at a later time and are referred to as capabilities-with-reboot in embodiments herein. The natural language capabilities database and corresponding entries in a capability intent values database may include available firmware or hardware capabilities for one or more hardware components executable at the platform level, including capabilities-with-reboot having designations requiring reboot to BIOS to be performed. The hardware processor executing code instructions of the OTB AI productivity tool may then direct execution of these firmware or hardware capabilities for hardware at the platform level based on similarity matching with a user query input received at the OTB AI productivity tool at the OS level to identify responsive capabilities, including responsive capabilities-with-reboot in embodiments herein.

Prior to such a process and prior to a user providing such a user query input into an OTB AI productivity tool at the OS level, hardware components or firmware may register with the OTB AI productivity tool firmware or hardware capabilities achievable by one or more versions of firmware for hardware components at the platform level. Such a registration of firmware or hardware capabilities at an OTB AI productivity tool may take into account current configurations and policies of the various firmware, or those hardware components, and include designation as requiring reboot where required as set by an information technology decision maker (ITDM) managing a plurality of information handling system within an enterprise system. The ITDM for enterprises may issue a policy setting configurations for a plurality of information handling systems within the enterprise to control functionality of various firmware or hardware components at individual information handling systems. In some cases, these policies may disable or limit functionality of one or more hardware components causing them to be unavailable on reboot. For example, ITDMs within an enterprise management system may enable, disable or control specific functionality for an external communication port, such as a universal serial bus (USB) drive, a camera, a user identification sensor, such as a fingerprint, voice, or iris scanner, or one or more radios, such as a Bluetooth® radio. Changing functionality of any of these hardware components, such as by enabling user access to a secured external communication port, a secured camera, or a secured radio (e.g., as secured by an ITDM disabling user access previously), or by disabling a user identification sensor for quicker and easier access by the user to the information handling system may require approval by the ITDM or enterprise management system and reinitialization of the hardware component at issue. Reinitialization of the hardware component in embodiments may involve closing the operating system (OS), executing a pre-boot script or machine readable code instructions for initializing the hardware component with the requested and ITDM approved new configuration (e.g., disabling, enabling, limiting access, or other) for the hardware component at issue, and rebooting the OS to a pre-boot operation state or even to a post-boot OS operational state. This may be required to execute identified responsive capabilities-with-reboot in example embodiments. In embodiments where ITDM or enterprise management system authorization is required in order to execute an identified firmware or hardware capability that is a responsive capability-with-reboot, metadata for that firmware or hardware capability will indicate a reboot requirement as well as include a flag or notification for the OTB AI productivity tool of such a requirement for management system authentication and security. Thus, hardware processor executing machine readable code instructions of a pre-boot script authorization system of the OTB AI productivity tool may be executed to conduct providing for machine readable code instruction for the responsive capability-with-reboot as well as securing enterprise management system for authorization for execution of that machine readable code instruction for the responsive capability-with-reboot, including initializing a secure platform level hardware component, upon reboot to BIOS in a pre-boot state before full boot up to the OS or even a post-boot state to boot to OS.

These firmware or hardware capabilities (also called capability intents and having capability intent values), including for a responsive capability-with-reboot, may describe those functionalities of each of one or more versions of firmware for one or more hardware components that may be executed when interfacing with the OTB AI productivity tool. Natural language descriptions of the firmware or hardware capabilities may be stored within a natural language capability database for comparison to received user query inputs, for example, in order to identify a firmware or hardware capability most likely to address a user's request within the received user query inputs.

A hardware processor executing machine readable code instructions for a capability intent value generator embedding process of the OTB AI productivity tool may determine capability intent values associated with these natural language descriptions of the firmware or hardware capabilities, as well as for any available software capabilities. These capability intent values are a mathematical representation, such as a vectorized capability intent value in a multi-axis vector space, of capability operations or services of firmware or hardware capabilities at the platform level or even software capabilities at an OS level in embodiments herein. Such capability intent values as vectors are used in a natural language processing method of execution of a large language model (LLM) for an OTB AI productivity tool to determine and correlate the user's query intent or requested action within a user query input that takes into account the context or semantics of the words used within the user query input with one of a plurality of firmware or hardware capabilities at the platform level or software capabilities at an OS-level. For example, in addition to firmware or hardware capabilities including capabilities-with-reboot, the OTB AI productivity tool also has access to available software capabilities of AI productivity tool-enableable software applications executing at the information handling system according to embodiments herein.

Upon receipt of a user query input by the OTB AI productivity tool in embodiments herein, a hardware processor executes code instructions to determine a vectorized query input intent value for the user query input that is compared to the capability intent values. The hardware processor executing machine readable code instructions for a query intent to capability determination module in embodiments herein may then perform one or more similarity search methods to match the query input intent value capability intent values, including the one or more firmware or hardware capability intent values, in order to identify a responsive capability to address the user request within the user query input. As described in embodiments herein, in some cases an identified best match firmware or hardware capability that is responsive to address the user request within the user query input may require getting ITDM or enterprise management system approval, closing the operating system (OS), executing a pre-boot script or machine readable code instructions for initializing the hardware component to execute the capability function such as with ITDM approved new configuration (e.g., disabling, enabling, limiting access, or other) for the hardware component at issue, and rebooting the OS to a pre-boot or post-boot state for execution. These firmware or hardware capabilities may be referred to as a responsive capability-with-reboot. In such cases, the best match responsive capability-with-reboot to address the user's query input may include metadata that notifies the OTB AI productivity tool that ITDM or enterprise management system authorization is required as well as a reboot for execution of that responsive capability.

Many AI productivity tools or chat-bots can only execute machine readable code instructions during the same user session within the OS in which it receives the user request to do so. In other words, these AI productivity tools cannot direct execution of code instructions for responsive capabilities once the OS has been powered down or rebooted, for example into a pre-boot state. This disallows for execution of the required pre-boot script or machine readable code instructions for initializing a secured platform-specific hardware component for execution of machine readable code instruction for the responsive capability when it requires reboot as described herein. The OTB AI productivity tool in embodiments of the present disclosure address this issue by requesting and retrieving the pre-boot script or machine readable code instructions for initialization the hardware component and execution of functionality requested in a responsive capability-with-reboot from the ITDM or enterprise management system. The best match responsive capability-with-reboot identified by the OTB AI productivity tool in embodiments herein may be transmitted by a pre-boot script authorization system of the OTB AI productivity tool to the enterprise management system with a request to generate and transmit pre-boot machine readable code instructions for initialization of a secure hardware component (e.g., securely managed by the enterprise management system to be either enabled or disabled at the information handling system) and execute functionality identified within the best match responsive capability-with-reboot. The pre-boot script authorization system may attach platform specific metadata that is specific to the client information handling system, such as a serial number or device identification number, to attest that best match responsive capability-with-reboot is specific to this client information handling system to the enterprise management system in embodiments herein. The enterprise management system may respond by generating such pre-boot code instructions for the responsive capability-with-reboot, if approved for the requesting information handling system, and transmitting them back to the OTB AI productivity tool. Further, pre-boot code instructions for responsive capability-with-reboot may be secured with a private key-public key encryption in response and transmittal back to the client information handling system.

Upon receipt of the enterprise approved pre-boot machine readable code instructions for the responsive capability-with-reboot including initialization of the secure hardware component identified that is most responsive to the received user query input, those retrieved code instructions for the responsive capability-with-reboot may be stored by the pre-boot script authorization system within a pre-boot memory partition that is accessible by the OTB AI productivity tool and a BIOS for the information handling system. Additionally, any pre-execution functions specified in the responsive capability-with-reboot in preparation for reboot may be executed in some embodiments prior to reboot. The pre-boot script authorization system of the OTB AI productivity tool in embodiments may then set the OS for reboot to prompt the BIOS to execute the stored code instructions on pre-boot. Upon shutting down of the OS, the BIOS in embodiments may automatically check the pre-boot memory partition for the stored pre-boot machine readable code instructions for initialization of the secure hardware component, execute the pre-boot machine readable code instructions for the responsive capability-with-reboot to initialize the hardware component and execute any functionality addressed in the user query input, as authorized and generated by the enterprise management system, and reboot the OS. Upon such a reboot of the OS, the user may then operate the hardware component addressed within the received user query input by the responsive capability-with-reboot as requested by the user. In such a way, the OTB AI productivity tool in embodiments herein may direct request and retrieval from the enterprise management system of machine readable code instructions for a responsive capability-with-reboot that includes initialization of those hardware components addressed in the user query, rebooting of the operating system, and execution of a basic input output system (BIOS) at the platform level to initialize those hardware components through execution of the received machine readable code instructions.

Turning now to the figures, FIG. 1 illustrates an information handling system 100 similar to the information handling systems according to several aspects of the present disclosure. As described herein, machine readable code instructions for an on the box (OTB) artificial intelligence (AI) productivity tool 150 in an embodiment may execute at the operating system 113 level of an information handling system 100. The OTB AI productivity tool 150 may allow user queries to trigger certain firmware or hardware capabilities for firmware for hardware components at a platform level. Examples of firmware may include microphone firmware 191*b* or external communication port firmware 199*b*, or firmware for hardware input/output devices 190 (e.g., input/output device 190, power management unit 107, display device 115*a*, microphone 191*a*, external communication port 199*a*) or network interface device 130. In some cases, user queries received at the OTB AI productivity tool 150 may prompt or request functionality of hardware components (e.g., input/output device 190, power management unit 107, display device 115*a*, network interface device 130, microphone 191*a*, external communication port 199*a*) for the information handling system 100 requiring reboot of the operating system (OS) and reinitialization of those hardware components, and may be referred to as responsive capabilities-with-reboot in embodiments herein.

An enterprise management system 157 that manages the information handling system 100 may have configured the information handling system 100 to disable or limit functionality of or access to the hardware components (e.g., input/output device 190, power management unit 107, display device 115*a*, network interface device 130, microphone 191*a*, external communication port 199*a*) addressed in the received user query. In such cases, a hardware processor 102 executing machine readable code instructions of the OTB AI productivity tool 150 in an embodiment may direct request and retrieval from the enterprise management system 157 of machine readable code instructions 181 for a responsive capability-with-reboot that includes initialization of those hardware components (e.g., input/output device 190, power management unit 107, display device 115*a*, network interface device 130, microphone 191*a*, external communication port 199*a*) addressed in the user query, rebooting of the operating system 113, and execution of a basic input output system (BIOS) 110 at the platform level to initialize those hardware components (e.g., input/output device 190, power management unit 107, display device 115*a*, network interface device 130, microphone 191*a*, external communication port 199*a*) and execute capability functionality through execution of the received machine readable code instructions 181 for the responsive capability-with-reboot.

A hardware processor 102 executing code instructions of the OTB AI productivity tool 150 in an embodiment may receive user queries via an input/output device 190 such as a keyboard, microphone, or video camera, described herein as user query inputs. The hardware processor 102 executing machine readable code instructions of OTB AI productivity tool 150 may match received user query inputs to known available capabilities, including firmware or hardware capabilities for various hardware components (e.g., input/output device 190, power management unit 107, display device 115*a*, network interface device 130, microphone 191*a*, external communication port 199*a*) at a platform level. In some cases, the identified best match firmware or hardware capability that is responsive to address the user request within the user query input is a responsive capability-with-reboot that requires getting ITDM or enterprise management system 157 approval, closing the OS 113, executing pre-boot machine readable code instructions 181 for initializing the secure hardware component with ITDM approved new configuration (e.g., disabling, enabling, limiting access, or other) for the hardware component (e.g., input/output device 190, power management unit 107, display device 115*a*, network interface device 130, microphone 191*a*, external communication port 199*a*) at issue, and rebooting the OS 113. In such cases, the best match responsive capability-with-reboot to address the user's query input may include metadata that notifies the OTB AI productivity tool 150 that reboot is required and that an ITDM or enterprise management system 157 authorization is required for execution of the capability.

The hardware processor 102 executing machine readable code instructions of a pre-boot script authorization system 158 of the OTB AI productivity tool 150 in an embodiment may identify that a responsive capability requires reboot and enterprise management system 157 authorization based on a flag or metadata associated with the responsive capability-with-reboot in a capabilities database. The pre-boot script authorization system 158 may attach metadata for platform specific metadata that is specific to the client information handling system 100 and any generated script or machine readable code instructions generated for executing the best match responsive capability-with-reboot responsive to a user query input. Example platform specific metadata to information handing system 100 may include a serial number for the information handling system 100 or any components therein, or a device identification number, such as a Dell® Device Identification (DDID) for the information handling system 100. This platform specific metadata for the best match responsive capability-with-reboot is used to attest that best match responsive capability-with-reboot is specific to this client information handling system to the enterprise management system in embodiments herein for authentication as well as secure exchange, such as via private/public key encryption.

The pre-boot script authorization system 158 operates to request and retrieve the pre-boot machine readable code instructions 181 for the responsive capability-with-reboot attested with platform specific metadata in embodiments herein. The responsive capability-with-reboot may include initialization of the hardware component (e.g., input/output device 190, power management unit 107, display device 115*a*, network interface device 130, microphone 191*a*, external communication port 199*a*) from the ITDM or enterprise management system 157 via the network interface device 130. The best match responsive capability-with-reboot identified by the OTB AI productivity tool 150 in an embodiment may be transmitted via the network interface device 130 by the pre-boot script authorization system 158 to the enterprise management system 157 with a request to generate and transmit the pre-boot machine readable code instructions 181 for the responsive capability-with-reboot that includes initialization of a secure hardware component (e.g., securely managed by the enterprise management system to be either enabled or disabled at the information handling system) identified within the best match responsive capability-with-reboot. The enterprise management system 157 may respond by generating such pre-boot code instructions 181 for the responsive capability-with-reboot, if approved for the requesting information handling system 100, and transmitting them back to the OTB AI productivity tool 150, via the network interface device 130.

Upon receipt of the enterprise approved pre-boot machine readable code instructions 181 for the responsive capability-with-reboot that that may include initialization of the secure hardware component (e.g., input/output device 190, power management unit 107, display device 115*a*, network interface device 130, microphone 191*a*, external communication port 199*a*) identified in the best match capability most responsive to the received user query input, those retrieved code instructions 181 may be stored by the hardware processor 102 executing machine readable code instructions of the pre-boot script authorization system 158 within a pre-boot memory partition 180 that is accessible by the OTB AI productivity tool 181 and a BIOS 110 for the information handling system 100. For example, the pre-boot memory partition 180 may be a partition within non-volatile (NV) static memory 105, such as NV random access memory (NV-RAM), BIOS 110 RAM or within a system file of static memory 105 or memory drive 120, or may be an extensible firmware interface (EFI) partition of NV memory. The hardware processor 102 executing machine readable code instructions of BIOS 110 and pre-boot script authorization system 158 may access such NV memory (e.g., 105 or 120) to store and retrieve the pre-boot machine readable code instructions 181 via an inter-connected inter-integrated circuit (I2C) communication protocol, such as a sideband channel, for example.

The hardware processor 102 executing machine readable code instructions of the OTB AI productivity tool 150 in an embodiment may then set the OS 113 for reboot to prompt the BIOS 110 to execute the stored code instructions 181 for the responsive capability-with-reboot on pre-boot. Upon shutting down of the OS 113, the hardware processor 102 executing machine readable code instructions of the BIOS 110 in an embodiment may automatically check the pre-boot memory partition 180 for the stored pre-boot machine readable code instructions 181 for the responsive capability-with-reboot that may include initialization of the secure hardware component (e.g., input/output device 190, power management unit 107, display device 115*a*, network interface device 130, microphone 191*a*, external communication port 199*a*). Upon locating the pre-boot machine readable code instructions 181, the hardware processor 102 executing machine readable code instructions of the BIOS 110 may execute the pre-boot machine readable code instructions 181 of the responsive capability-with-reboot to initialize the hardware component (e.g., input/output device 190, power management unit 107, display device 115*a*, network interface device 130, microphone 191*a*, external communication port 199*a*) to execute any capability functions addressed in the user query input, as authorized and generated by the enterprise management system 157.

Upon such a reboot of the OS 113, the user may then operate the hardware component (e.g., input/output device 190, power management unit 107, display device 115*a*, network interface device 130, microphone 191*a*, external communication port 199*a*) any capability functions of the responsive capability-with-reboot responding to the received user query input as requested by the user. In such a way, the hardware processor 102 executing machine readable code instructions of the pre-boot script authorization system 158 in an embodiment may direct request and retrieval from the enterprise management system 157 of machine readable code instructions 181 for the responsive capability-with-reboot to include initialization of those hardware components (e.g., input/output device 190, power management unit 107, display device 115*a*, network interface device 130, microphone 191*a*, external communication port 199*a*) and for a capability function to respond to the user query, rebooting of the operating system 113, and execution of BIOS 110 at the platform level to initialize those hardware components (e.g., input/output device 190, power management unit 107, display device 115*a*, network interface device 130, microphone 191*a*, external communication port 199*a*) and responsive capability-with-reboot functions through execution of the received machine readable code instructions 181.

In some cases, this process may be made more secure by ensuring that the hardware processor 102 executing machine readable code instructions of BIOS 110 only executes machine readable code instructions 181 for the responsive capability-with-reboot including initialization of a secure hardware component (e.g., input/output device 190, power management unit 107, display device 115*a*, network interface device 130, microphone 191*a*, external communication port 199*a*) that have been specifically tailored for execution at the specified client information handling system 100 where the user query input has been received. For example, when transmitting to the enterprise management system 157 the best match responsive capability-with-reboot for firmware or hardware identified as responsive to the received user query input, along with the request to authorize and generate pre-boot machine readable code instructions 181 for the best match responsive capability-with-reboot, the hardware processor 102 executing machine readable code instructions of the OTB AI productivity tool 150 may append one or more platform-specific specific identifiers for the information handling system 100 in metadata. More specifically, the hardware processor 102 executing machine readable code instructions of the OTB AI productivity tool 150 may append a MAC address, serial number for a motherboard or other hardware component (e.g., hardware processor 102), enterprise assigned ID, or a manufacturer ID (e.g., a DDID) for the information handling system 100, or enterprise assigned service tag for the information handling system 100. Any platform-specific identification metadata (e.g., any identifiers specifically identifying the platform level hardware components of the information handling system 100) may be used by the pre-boot script authorization system 158 in various embodiments herein to attest the machine readable code instruction or script for the responsive capability-with-reboot as specified to the information handling system 100 that received a user query input. For example, the machine readable code instructions for the responsive capability-with-reboot may be generated on box at the information handling system in some embodiments or the responsive capability-with-reboot may be transmitted to the enterprise management system 157 in other embodiments for generation of machine readable code instructions or script for the responsive capability-with-reboot.

In such an embodiment for remote generation, the enterprise management system 157 may also append within metadata for or directly within the executable code instructions 181, or otherwise attach to the code instructions 181 the same platform-specific ID information received from the pre-boot script authorization system 158 in tandem with the identified best match responsive capability-with-reboot. Thus, pre-boot script authorization system 158 of the OTB AI productivity tool 150 may receive the pre-boot machine readable code instructions 181 from the enterprise management system server 157 with an ID of the information handling system 100 for which the pre-boot machine readable code instructions 181 of a responsive capability-with-reboot have been generated. This received pre-boot machine readable code instructions 181 of the responsive capability-with-reboot may be also subject to authorization by the ITDM at the enterprise management system 157. A cloud based authorization service at the enterprise management system 157 is used to grant that authorization for the pre-boot machine readable code instructions 181 of a responsive capability-with-reboot and the pre-boot machine readable code instructions 181 of a responsive capability-with-reboot is securely transmitted, such as via a private/public encryption, back to the pre-boot script authorization system 158 at the information handling system 100. This pre-boot machine readable code instructions 181 of a responsive capability-with-reboot with appended platform-specific ID metadata and encrypted with authorization is then stored in a pre-boot memory partition 180 by the pre-boot script authorization system 158 according to embodiments herein.

Upon retrieval of the pre-boot machine readable code instructions 181 of the responsive capability-with-reboot from the pre-boot memory partition 180 by the hardware processor 102 executing machine readable code instructions of BIOS 110, the hardware processor 102 executing machine readable code instructions of BIOS 110 may first ensure that the appended platform-specific ID matches identification of the information handling system 100 upon reboot to BIOS. This may occur before executing the pre-boot machine readable code instructions 181 of the responsive capability-with-reboot after reboot to BIOS 110. This ensures transmittal of the pre-boot machine readable code instructions 181 of the responsive capability-with-reboot with authorization by an ITDM is directed to the correct managed information handling system 100 having received the user query input.

In still other aspects of an embodiment, initialization of secure hardware components in response to a received user query input at the OTB AI productivity tool 150 may be further secured by requiring a signed certificate for the pre-boot machine readable code instructions 181 of the responsive capability-with-reboot including initializing a secure hardware component. For example, upon receiving the pre-boot machine readable code instructions 181 of the responsive capability-with-reboot from the enterprise management system 157, with or without the platform-specific identifier in various embodiments herein, the hardware processor 102 executing machine readable code instructions of the pre-boot authorization system 158 may transmit, via the network interface device 130, the pre-boot machine readable code instructions 181 for the responsive capability-with-reboot to the enterprise management system 157 or to a cloud-based script authorization service there for certification of the pre-boot machine readable code instructions 181. In such an example embodiment, the OTB AI productivity tool 150 may receive, via the network interface device 130, a signed and certified version of the pre-boot machine readable code instructions 181, with a private key. Upon retrieval of the pre-boot machine readable code instructions 181 for the responsive capability-with-reboot from the pre-boot memory partition 180 by the BIOS 110, the hardware processor 102 executing machine readable code instructions of BIOS 110 in such an example embodiment may first provide a public key provisioned within BIOS 110 matching or corresponding to the private key for the signed and certified pre-boot machine readable code instructions 181 to access the script for the responsive capability-with-reboot. The hardware processor 102 executing machine readable code instructions of BIOS 110 may then execute the pre-boot machine readable code instructions 181 for the responsive capability-with-reboot to initialize the secure hardware component and any capability functions responsive to the received user query input.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), a graphics processing unit (GPU) 106, other hardware controllers, or any combination thereof. Additional components of the information handling system 100 may include one or more storage devices such as static memory 105 or drive unit 120. The information handling system 100 may include or interface with one or more communications ports for communicating with external devices, as well as an input/output (IO) device 190, a video/graphics display device 115*a*, an audio microphone 191*a* for recording user communications, or any combination thereof. Portions of an information handling system 100 may themselves be considered information handling systems 100.

Information handling system 100 may include devices or modules that embody one or more of the hardware devices or hardware processing resources executing machine readable code instructions for one or more systems and modules.

The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate on a plurality of information handling systems 100. In a specific embodiment, machine readable code instructions for the OTB AI productivity tool 150, a universal user conversational interface software application software application 170, one or more AI productivity tool enableable software applications 111, and firmware (e.g., 191*b* and 195*b*) may execute locally at the information handling system 100, or on the box.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 120 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, GPU 106, or any other hardware processing device. The information handling system 100 may also include one or more buses 117 operable to transmit communications between the various hardware components such as any combination of various I/O devices 190, 191*a*, 193*a*, as well as between hardware processors 102, GPU 106 or other, the operating system (OS) 113, the basic input/output system (BIOS) 110, the wireless interface adapter 130, or a radio module 132, among other components described herein. In an embodiment, the hardware processor 102, and/or GPU 106 may execute one or more bus drivers in order to transmit this data between the information handling system 100 and the input/output devices 190 described herein. As described herein, the information handling system 100 further includes a video/graphics display device 115*a*. The video/graphics display device 115*a* in an embodiment may function as a liquid crystal display (LCD), an organic light emitting diode (OLED), a flat panel display, or a solid-state display. It is appreciated that the video/graphics display device 115*a* may be wired or wireless and may be an external video/graphics display device 115*a* that allows a user to increase the desktop area by extending the desktop in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols. In a specific example embodiment, the wireless interface device 130 may be a Bluetooth® radio that can be disabled or enabled with enterprise approval via execution by the hardware processor 102 and BIOS 110 of the stored pre-boot machine readable code instructions 181 for initializing a secure hardware component.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, or any other hardware processing resource and may include software agents, or other aspects or components used to execute the methods and systems described herein. Various software modules comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 120 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 120 during execution by the hardware processor 102, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 120 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 120, the hardware processor 102 (e.g., CPU), the GPU 106, a video/graphic display device 115*a*, or other wired I/O devices 191*a*, 195*a*, or 190 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
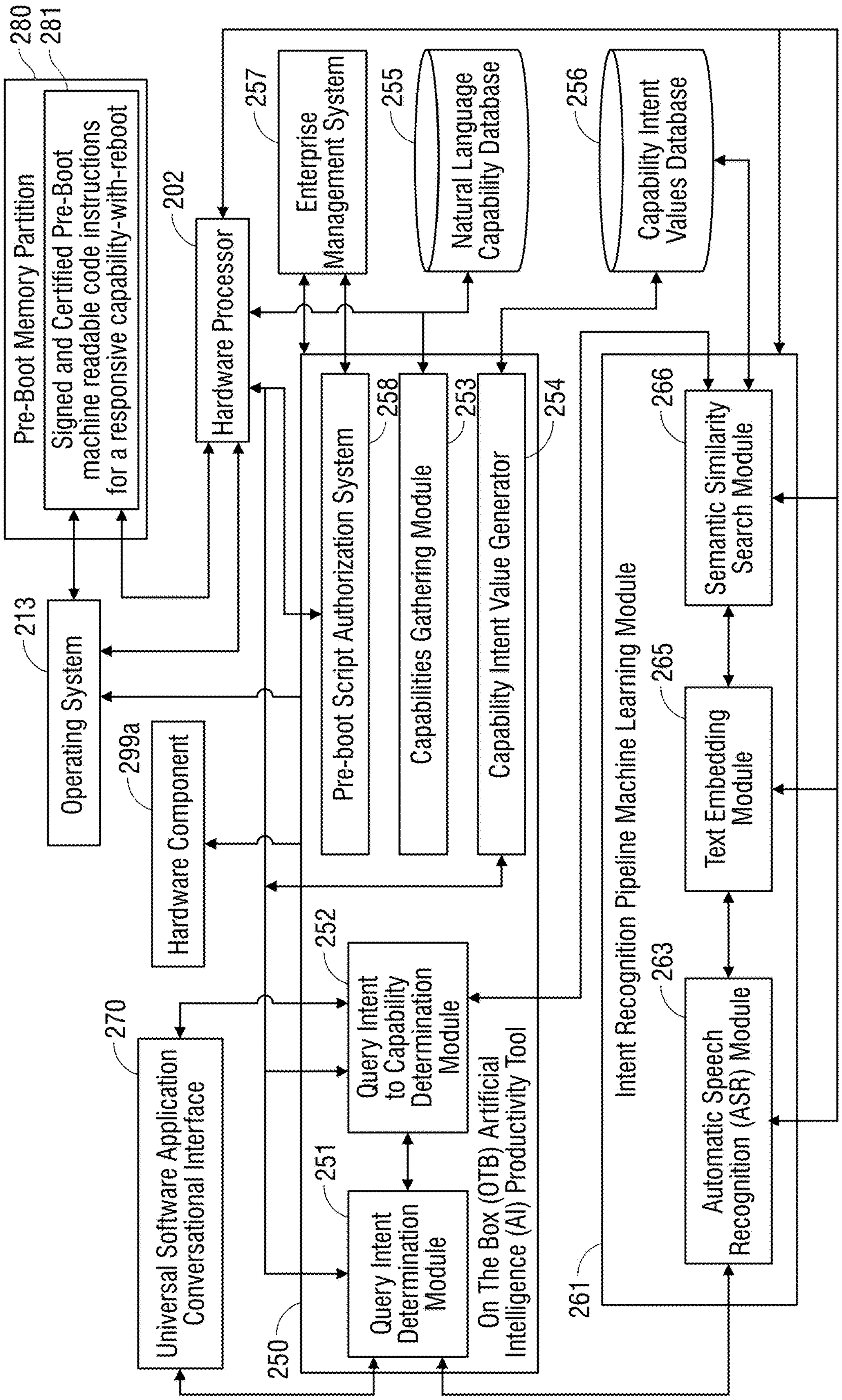
FIG. 2 is a block diagram illustrating an information handling system executing machine readable code instructions for an OTB AI productivity tool for performing a semantic similarity search to identify best match responsive capability requiring reboot for a received user query input according to an embodiment of the present disclosure.

FIG. 2 is a block diagram illustrating an on the box (OTB) AI productivity tool for performing a semantic similarity search to identify a best match responsive capability-with-reboot among available software, firmware, or hardware capabilities requiring execution of pre-boot machine readable code instructions including initializing a secure hardware component of the information handling system according to an embodiment of the present disclosure. A hardware processor executing a pre-boot authorization system 258 of an OTB AI productivity tool 250 may authorize generation and execution of the responsive capability-with-reboot as managed by a remote enterprise management system 257 for a received user query input requesting action on behalf of an information handling system according to an embodiment.

As described herein, user queries received at the OTB AI productivity tool 250 may prompt or request and match to a responsive capability-with-reboot with functionality of hardware components (e.g., 299*a*) for the information handling system requiring reboot of the operating system (OS) 213 and reinitialization of those hardware components (e.g., 299*a*). An enterprise management system 257 that manages the information handling system may have configured the information handling system to disable or limit functionality of the hardware components, such as 299*a* which may be functioning in an example embodiment as an external communication port (e.g., universal serial bus (USB) port) that is also addressed in the received user query. In such cases, the pre-boot script authorization system 258 of the OTB AI productivity tool 250 in an embodiment may direct request and retrieval from the enterprise management system 257 of machine readable code instructions 281 for the responsive capability-with-reboot that includes initialization of those hardware components (e.g., 299*a*) and execution of capability functions responsive to the user query, and rebooting of the operating system (OS) 213 in embodiments herein.

Prior to such a process and prior to a user providing such a user query input into an OTB AI productivity tool 250, the hardware component (e.g., 299*a*) or firmware therefor may register with the OTB AI productivity tool 250 software, firmware or hardware capabilities, including capabilities-with-reboot, with a capabilities gathering module 253. Such a registration of firmware or hardware capabilities at an OTB AI productivity tool 250 may take into account current configurations and policies of the various firmware, or those hardware components (e.g., 299*a*), as set by an information technology decision maker (ITDM) managing a plurality of information handling system within an enterprise system. The ITDM for enterprises may issue a policy setting configurations for a plurality of information handling systems within the enterprise to control functionality of various firmware or hardware components, such as 299*a* at individual information handling systems. In some cases, these policies may disable or limit functionality of one or more hardware components, such as 299*a*, such that they would not be accessible via responsive capabilities that require a reboot. For example, ITDMs within an enterprise management system may enable, disable or control specific functionality for an external communication port, such as a universal serial bus (USB) drive, a camera, a user identification sensor, such as a fingerprint, voice, or iris scanner, or one or more radios, such as a Bluetooth® radio. Changing functionality of any of these hardware components (e.g., 299*a*) may require authorization by an ITDM, such as by enabling user access to a secured external communication port, a secured camera, or a secured radio (e.g., as secured by an ITDM disabling user access previously), or by disabling a user identification sensor for quicker and easier access by the user to the information handling system may require approval by the ITDM or enterprise management system 257 and reinitialization of the hardware component (e.g., 299*a*) at issue. Reinitialization of the hardware component, such as 299*a* in an embodiment may involve closing the OS 213, executing a pre-boot machine readable code instruction 281 for the responsive capability-with-reboot that may include initializing the hardware component 299*a* with the requested and ITDM approved new configuration (e.g., disabling, enabling, limiting access, or other) for the hardware component 299*a* at issue, and rebooting the OS 213 to BIOS. In an embodiment where ITDM or enterprise management system 257 authorization is required in order to execute an identified firmware or hardware capability that is a responsive capability-with-reboot registered with the capability gathering module 253, metadata for that firmware or hardware capability requiring a reboot may include a flag or notification for the OTB AI productivity tool 250 of such a reboot requirement.

In an embodiment, the capability intent values database 256 may store a plurality of capabilities associated with each of a plurality of AI productivity tool-enableable software applications or a plurality of firmware or hardware components, such as 299*a* with a name, capability ID, natural language descriptor, or a capability intent value in some embodiments. These capabilities stored at the capability intent values database 256 may include any input and output capabilities provided by hardware component, such as 299*a* or firmware therefor being executed by the hardware processor 202 or any other hardware processing devices, such as an embedded controller. A hardware processor executing machine readable code instructions for a capability intent value generator 254 embedding process of the OTB AI productivity tool 250 may determine capability intent values associated with these natural language descriptions of the software, firmware, or hardware capabilities in the capability intent values database 256. These capability intent values are a mathematical representation, such as a vectorized capability intent value in a multi-axis vector space, of capability operations or services of software, firmware, or hardware components, such as 299*a* in embodiments herein. Such capability intent values as vectors are used in a natural language processing method of execution of a large language model (LLM) for an OTB AI productivity tool 250 to determine and correlate the user's query intent or requested action within a user query input that takes into account the context or semantics of the words used within the user query input such as with one of a plurality of firmware or hardware capabilities at the platform level.

The OTB AI productivity tool 250 in an embodiment may receive, via a universal user conversational interface software application 270 or other interface, a voice, image, or text input from a user, described herein as a user query input, that requests actions or services of the AI productivity tool 250. These actions or services may include firmware or hardware capabilities executable for one or more versions of firmware for various hardware components, some of which may be firmware or hardware capabilities with a reboot requirements referred to as capabilities-with-reboot. A hardware processor 202 executing code instructions of the OTB AI productivity tool 250 in an embodiment may match these received user query inputs to known firmware or hardware capabilities, including responsive capabilities-with-reboot, stored at the natural language capabilities database 255. For example, a hardware processor 202 in an embodiment may execute code instructions of the OTB AI productivity tool 250 to match a received user query input requesting access to a hardware component, such as 299*a* that has been disabled or restricted for access by the enterprise management system 257 for security reasons, to a responsive capability-with-reboot for operating that secure hardware component 299*a*. More specifically, such a user query input may specifically request access to an external communication port (e.g., USB port), a camera, a microphone, or a Bluetooth® or other type of radio that has been disabled or restricted by the enterprise management system 257 for security reasons.

In another example embodiment, a hardware processor 202 may execute code instructions of the OTB AI productivity tool 250 to match a received user query input requesting to turn off a hardware component, such as 299*a*, that has been enabled and required for operation of the OS 213 by the enterprise management system 257 for security reasons, to a responsive capability-with-reboot for disabling that secure hardware component 299*a*. More specifically, such a user query input may specifically request disabling or turning off an identification sensor, such as a thumbprint scanner, iris scanner, voice recognition module, or face recognition module that has been enabled by the enterprise management system 257 for security reasons and may be required for access to the OS 213.

A query input received by the OTB AI productivity tool 250 is processed into a query intent vector value for semantic or lexical matching with available firmware or hardware capabilities in the natural language capabilities database 255 or the capability intent values database 256 in embodiments. Firmware or hardware capabilities registered at the OTB AI productivity tool 250 are provided text descriptors that may be processed into vectorized capability intent values in a multi-axis vector space via embedding algorithm applied to the natural language descriptions of the firmware or hardware capabilities. These embedded vectorized capability intent values for firmware or hardware capabilities are mathematical representations that may be correlated by a semantic similarity matching algorithm to a query intent value generated via an embedding a user query input to select a responsive firmware or hardware capability that is a best match or meets a threshold similarity search score to be responsive to a user query input from a user.

The hardware processor 202 executing machine readable code instructions of the OTB AI productivity tool 250 may determine firmware or hardware capability intent values, including capabilities-with-reboot, associated with natural language descriptions of the firmware or hardware capabilities. These capabilities intent values are a mathematical representation of the natural language descriptions of capability operations or services of firmware to control one or more hardware components, such as 299*a*, in an embodiment. These firmware or hardware capability intent values, including for capabilities-with-reboot, may be represented by a mathematical value in a multi-axis vector space that may be associated with the natural language description for that capability or intent. In an embodiment, the firmware or hardware capabilities including capabilities-with-reboot may also be associated with an identification (ID) such as an alphanumeric ID that may be stored within a capability intent values database 256. Generating such firmware or hardware capability intent values as vectors may be a first step in a natural language processing method to determine a firmware or hardware capability, such as a responsive capability-with-reboot, corresponding to and responsive to the user's intent or requested action within a user query input that takes into account the context or semantics of the words used within the user query input.

In an embodiment, the capability intent values database 256 may store a plurality of firmware or hardware capability intent values of capabilities, including capabilities-with-reboot, embedded via an embedding algorithm from the natural language descriptions of those capabilities in the natural language capability database 255. The capability intent values database 256 may store include a name, capability ID, natural language descriptor, or a capability intent value, as well as any reboot flag or metadata, for each available firmware or hardware capability including capabilities-with-reboot in some embodiments. It is understood that in some embodiments, the natural language capability database 255 and the capability intent values database 256 may be the same database whereas in other embodiments it may be a distributed database. These firmware or hardware capabilities, including capabilities-with-reboot, stored at the capability intent values database 256 may further include any input and output for the firmware or hardware capabilities executable by the hardware processor 202 or any other hardware processing devices, such as an embedded controller.

The firmware or hardware capabilities, including capabilities-with-reboot, may be registered with the OTB AI productivity tool 250 in an embodiment for establishing capability intent values for these firmware or hardware capabilities such that chat user query input embedded as query intent values may be correlated with capability intent values for registered firmware or hardware capabilities, as described herein. For example, a hardware processor 202 executing machine readable code instructions of the OTB AI productivity tool 250 may execute firmware or hardware capabilities-with-reboot identified within metadata for the firmware or hardware capabilities stored in the natural language capabilities database 255 or the capability intent values database 256 as requiring authorization from an enterprise management system 257 and reboot, as described herein. The firmware or hardware capability intent values for registered firmware or hardware capabilities, including capabilities-with-reboot, are a vectorized mathematical representation in a multi-axis vector space of the natural language descriptions of capability operations or services from one or more versions of firmware or hardware components, such as 299*a* in an embodiment. The firmware or hardware capability intent values are generated using natural language processing (NLP) techniques via execution of machine readable code instructions by the hardware processor 202 of the query intent determination module 251 and the text embedding module 265 in an example embodiment. Each axis of the multi-axis vector space may provide a measurement of various meaning value attributes of a text excerpt of words or phrases that are known to provide context or semantic understanding of the text. For example, one or more axis values may represent a reader's understanding of a given text excerpt may depend upon the reader's knowledge of any given word's meaning within the text, identified phrases within the text, or the understood order or sequence of words within the text. More specifically, one or more axis values may represent the reader's understanding as enhanced with a larger vocabulary and assigned values for which words in that vocabulary are synonyms (closer in meaning) to a given word in that text, and which words are antonyms (further away in meaning) to that given word. As another example, one or more axis values may represent the reader's ability to identify common phrases, such as "in other words" may provide greater insight to the semantic meaning of a text excerpt using this phrase than an understanding of each of the words "in," "other," and "words" used separately from one another would. As yet another example, one or more axis values may represent the importance of the order of certain words in an excerpt may impact semantic meaning of the excerpt. More specifically, the phrase "man bites dog" may have a completely different semantic or contextual meaning than the phrase "dog bites man," although each phrase has the same words, just in a different order.

Each axis of the multi-axis vector space, and thus, each value within a vector within such a multi-axis vector space may provide a measurement of these various attributes within a given initial or updated capability intent value in embodiments herein. Hundreds of vector axes may be the basis for the intent vector value in a multi-dimensional "space." For example, a vector for a user query input intent value or for capability intent value may provide a measurement of similarity between any given word within the user query input or the capabilities, respectively, a measurement of dissimilarity with known antonyms, identification of any given word as part of a phrase, or usage of any given word in a specific order that is known to be of importance. In such a way, the vectorized user query input intent value and firmware or hardware capability intent values may mathematically represent a reader's contextual or semantic understanding of the user query input and the natural language descriptors for the capabilities of the one or more versions of firmware for hardware components, such as 299*a*. These vectors may then be compared to one another, via the hardware processor 202 executing machine readable code instructions of the semantic similarity search module 266 to determine statistical correlation, in order to understand how alike various phrases within the user query input and the firmware or hardware capabilities are, and how alike the usage of those words and phrases are to provide a context, such as influenced by the order of those words or phrases and their relation to one another, as well as other semantic factors represented in the multi-axis vector space.

The hardware processor 202 may also execute machine readable code instructions of a text embedding module 265 to detect which of these words are nouns, verbs, or commonly used sentence structures and generate a vectorized query input intent value for the user query input. These vectorized capability intent values and vectorized query input intent values may then be compared to one another, via the hardware processor 202 executing machine readable code instructions of the semantic similarity search module 266, in order to determine a statistical correlation that represents understanding how alike various phrases within the user query input and firmware or hardware capabilities are, and how alike the usage of those words and phrases are to provide a context, such as influenced by the order of those words or phrases and their relation to one another. For example, the hardware processor 202 executing machine readable code instructions of the semantic similarity search module 266, and in some embodiments in tandem with algorithms of the text embedding module 265 may compare the vectorized query input intent value with the firmware or hardware capability intent values for capabilities-with-reboot stored within the capability intent value database 254 to identify a capability-with-reboot intent value correlated to the query input intent value. This similarity matching correlation indicates that the user query input is requesting execution of a responsive capability-with-reboot for the firmware or hardware associated with that capability-with-reboot intent value. Such a comparison, in an embodiment, may include, for example, determining a distance or a vector value difference between the vectorized query input intent value and the vectorized firmware or hardware capability intent value for a capability-with-reboot or a correlation value between the two. Examples of semantic similarity search module 266 algorithms may include, for example, a Cosine Similarity search machine learning model, a vector space model (VSM) similarity search machine learning model, or a K-Means Text Clustering similarity search machine learning model. These are only a few examples of semantic similarity search algorithms that may be employed and it is contemplated that any known or later-developed semantic similarity search algorithm may also be employed.

Upon determination of firmware or hardware capability intent values for each of the updated firmware or hardware capabilities, including for capabilities-with-reboot, determined by the OTB AI productivity tool 250 in an embodiment, the OTB AI productivity tool 250 may begin processing received user query inputs. The user query inputs are received at the universal conversational interface software application 270 or other interface for identification and execution of responsive firmware or hardware capabilities, including capabilities-with-reboot, corresponding to one or more of these firmware or hardware capability intent values. In an example embodiment, a user may provide a user query input in the form of text or voice data (e.g., via IO device 190, or microphone 191*a* of FIG. 1) to a universal user conversational interface software application 270, executing machine readable code instructions as a chatbot with the OTB AI productivity tool 250 to simulate a conversation between the user and OTB AI productivity tool 250. When a user provides a user query input in the form of text or voice data (e.g., via IO device 190, or microphone 191*a* of FIG. 1) to the universal user conversational interface software application 270, the hardware processor 202 executing machine-readable code instructions of the OTB AI productivity tool 250 in an embodiment may orchestrate assessment of the user's intended goals within the user query input (e.g., what the user wishes to achieve with this communication) with determination of a query input intent value. This user query input value is then used identify one or more firmware or hardware capabilities, such as a capability-with-reboot in embodiments of the present disclosure, that have a correlating firmware or hardware capability intent value and that is capable of executing a response to this user query input intent.

This orchestration in an embodiment may begin with the hardware processor 202 executing machine-readable code instructions of the query intent determination module 251 to receive the user query input via microphone, image, or text input, and initiate execution of machine readable code instructions for an intent recognition pipeline machine learning module 261. In an embodiment, the hardware processor 202 executing machine-readable code instructions for the intent recognition pipeline machine learning module 261 may further orchestrate any combination of a plurality of machine learning modules (e.g., 263, 265, or 266) to process the audio, image, or text input to determine the user's intended goal or query intent within the received text or voice data of the user query input.

During operation for example, the hardware processor 202 executing machine-readable code instructions of the query intent determination module 251 may load one or more machine learning models such that, for example, the text or voice input from the user may be processed through a speech recognition model 263 and/or processed through any of a plurality of natural language models (e.g., 265 or 266) or other ML models in order to determine a text of a user's input query or a vectorized query intent value in multi-axis space of the user's input query. For example, an automatic speech recognition (ASR) module 263, a text embedding module 265, or a semantic similarity search module 266 that work in various combinations with one another to detect a user's audio speech input, conversion to text or detecting text, and detecting an intent, represented by generating a query intent vector value from the text of the user query input received from the universal user conversational interface software application 270 or other interface.

Further, the hardware processor 202 executing machine-readable code instructions of an intent recognition pipeline machine learning module 261 may orchestrate the interplay between each of the ASR module 263 and text embedding module 265 to establish a query intent vector value in a multi-axis vector space defined with these machine learning models, as well as a semantic similarity search module 266 to correlate that query intent value with a corresponding capability intent value in an embodiment. Several text embedding algorithms may be used in various embodiments herein in order to provide a vectorized mathematical representation of semantic understanding for a user query input or for a capability described in natural language. For example, the text embedding module 265 may employ a Latent Semantic Analysis (LSA) or Latent Dirichlet allocation (LDA) which may define how close each of the observed terms in the received user query input are to various synonyms. As another example, the text embedding module 265 may employ a Word2Vec algorithm, which includes a neural network trained to understand which terms or phrases should be considered closer or further away from certain synonyms or antonyms. As yet another example, the text embedding module 265 may employ a fully recurrent neural network trained to consider the order of terms within the received user query input. Similar text embedding algorithms may be applied to embed the natural language descriptors of the firmware or hardware capabilities in embodiments herein.

In an embodiment in which the user provides text data to the OTB AI productivity tool 250, the intent recognition pipeline machine learning module 261 may truncate this process to exclude processes of the ASR module 263 in example embodiments. The hardware processor 202 executing machine-readable code instructions of the intent recognition pipeline machine learning module 261 in an embodiment may apply the text embedding module 265 to generate a query intent value as described and then return the output query intent value of the text embedding module 265 to the query intent to capability determination module 252. The query intent to capability determination module 252 may utilize the semantic similarity search module 266 for a correlation between the query intent value received and a stored firmware or hardware capability intent value for available firmware or hardware capabilities, including registered capabilities-with-reboot.

In embodiments herein, a hardware processor 202 may execute machine readable code instructions for a semantic similarity search module 266, via a query intent to capability determination module 252, that compares the vectorized user query input intent value and the registered firmware or hardware capability intent values, such as for a capability-with-reboot, stored within the capability intent values database 256. Such a comparison may be performed using a semantic search machine learning model, such as a cosine or other semantic similarity search algorithm that compares the distance or value difference in a multi-axis vector space between two vectors to determine the contextual similarity between the embedded text of natural language description of the firmware or hardware capabilities, including capabilities-with-reboot, having the generated firmware or hardware capability intent values and the natural language user query input having a user query input intent value generated from an embedded text algorithm. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability and query intent vector values. The cosine similarity search comparison or other semantic similarity search algorithm may be performed for several of the firmware or hardware capability intent values, including for capabilities-with-reboot, stored within the capability intent value database 256 to identify a best match firmware or hardware capability intent value that most closely matches the user query input value, according to embodiments herein. In some embodiments, a best match firmware or hardware capability intent value may correspond to a firmware or hardware capability that may be executed and performed within a same boot session. In other embodiments of the present disclosure, the best match firmware or hardware capability intent value may correspond to a firmware or hardware capability that must be executed and performed after reboot to BIOS and with authorization from an enterprise management system 257. These best match firmware or hardware capabilities are referred to as best match capabilities-with-reboot in embodiments herein.

A hardware processor 202 executing machine readable code instructions for a semantic similarity search module 266 may determine a distance, that is a value difference of the vector intent values within the multi-axis vector space between the query input intent value and each of a plurality of firmware or hardware capability intent values, such as for capabilities-with-reboot. Then, for each of those determined distances, the hardware processor 202 executing machine readable code instructions for a semantic similarity search module 266 may determine an angular similarity having a value between zero and one for the query input intent value and each of a plurality of firmware or hardware capability intent values, including for capabilities-with-reboot. This angular similarity value in an embodiment may comprise the semantic similarity search score for a given firmware or hardware capability intent value, where zero is a worst match and one is a best match between the given firmware or hardware capability intent value and the query input intent value. The hardware processor 202 in an embodiment may execute machine readable code instructions of an OTB AI productivity tool 250 query intent to capability determination module 252 to identify the natural language capability having a highest semantic similarity search score that meets a minimum threshold value (e.g., 0.5, 0.7, 0.9) as the best match firmware or hardware capability or best match capability-with-reboot for the received user query input.

In some cases, the identified best match responsive firmware or hardware capability is a best match responsive capability-with-reboot that is responsive to address the user request within the user query input may require getting ITDM or enterprise management system 257 approval, closing the OS 213, executing pre-boot machine readable code instructions 281 for initializing the secure hardware component with ITDM approved new configuration (e.g., disabling, enabling, limiting access, or other) for the hardware component (e.g., 299*a*) at issue for executing the responsive capability functions, and rebooting the OS 213. In such cases, the best match responsive capability-with-reboot to address the user's query input may include metadata that is detected by a pre-boot script authorization system 258 of the OTB AI productivity tool 250 that an ITDM or enterprise management system 257 authorization is required for execution of the best match responsive capability-with-reboot.

The hardware processor 202 executing machine readable code instructions for the pre-boot script authorization system 258 of the OTB AI productivity tool 250 in an embodiment may then request and retrieve the pre-boot machine readable code instructions 281 for the best match responsive capability-with-reboot that may include initialization of the hardware component (e.g., 299*a*) from the ITDM or enterprise management system 257. The best match responsive capability-with-reboot identified by the OTB AI productivity tool 250 in an embodiment may be transmitted pursuant to the hardware processor 202 executing machine readable code instructions for the pre-boot script authorization system 258 to the enterprise management system 257 with a request to generate and transmit the pre-boot machine readable code instructions 281 for the best match responsive capability-with-reboot including initialization of a secure hardware component (e.g., securely managed by the enterprise management system to be either enabled or disabled at the information handling system) identified within the best match responsive capability-with-reboot. The enterprise management system 257 may respond by generating such pre-boot code instructions 281 for the best match responsive capability-with-reboot, if approved for the requesting information handling system, and transmitting them back to the pre-boot script authorization system 258 of the OTB AI productivity tool 250. In other embodiments, the pre-boot machine readable code instructions 281 for the best match responsive capability-with-reboot may be generated on the box at the information handling system 100.

The hardware processor 202 executing machine readable code instructions of a pre-boot script authorization system 258 of the OTB AI productivity tool 250 in an embodiment may identify that a responsive capability requires reboot and enterprise management system 257 authorization based on a flag or metadata associated with the responsive capability-with-reboot in a capabilities database. The pre-boot script authorization system 258 may attach platform specific metadata that is specific to the client information handling system 200 and indicating any ITDM authorization or applied limitations to a generated script or machine readable code instructions generated for executing the best match responsive capability-with-reboot responsive to a user query input is specific to that information handling system as well. Example platform specific metadata to information handing system may include a serial number for the information handling system or any components therein, or a device identification number, such as a Dell® Device Identification (DDID) for the information handling system. This platform specific metadata for the best match responsive capability-with-reboot is used to attest that best match responsive capability-with-reboot is specific to this client information handling system to the enterprise management system in embodiments herein for authentication as well as secure exchange, such as via private/public key encryption.

The pre-boot script authorization system 258 operates to request and retrieve authorization for the pre-boot machine readable code instructions 281 for the responsive capability-with-reboot attested with platform specific metadata in embodiments herein. The responsive capability-with-reboot may include initialization of the platform-specific hardware component or capability functions with those platform-specific secure hardware components requiring authorization from the ITDM or enterprise management system 257 via the network interface device. The best match responsive capability-with-reboot identified by the OTB AI productivity tool 250 in an embodiment may be transmitted via the network interface device by the pre-boot script authorization system 258 to the enterprise management system 257 with a request to authorize any generated and transmitted pre-boot machine readable code instructions 281 for the responsive capability-with-reboot that includes initialization of a platform-specific secure hardware component (e.g., securely managed by the enterprise management system to be either enabled or disabled at the information handling system) identified within the best match responsive capability-with-reboot. The enterprise management system 257 may respond by obtaining authorization from an ITDM as well as securing the authorization data with such pre-boot code instructions 281 for the responsive capability-with-reboot, if approved for the requesting information handling system via an encryption, such as private/public encryption, and transmitting the encrypted pre-boot code instructions 281 for the responsive capability-with-reboot back to the pre-boot script authorization system 258 of the OTB AI productivity tool 250, via the network interface device.

Upon receipt of the enterprise approved pre-boot machine readable code instructions 281 for the best match responsive capability-with-reboot, the pre-boot script authorization system 258 may store the pre-boot machine readable code instructions 281 for the best match responsive capability-with-reboot within a pre-boot memory partition 280 at the information handling system. As described, the approved pre-boot machine readable code instructions 281 for the best match responsive capability-with-reboot may include initialization of the secure hardware component (e.g., 299*a*) identified as most responsive to the received user query input, and those retrieved and approved pre-boot machine readable code instructions 281 for the best match responsive capability-with-reboot may be stored by the hardware processor 202 within the pre-boot memory partition 280 such that it is accessible by the OTB AI productivity tool 281 and a BIOS for the information handling system (e.g., 110 of FIG. 1). The hardware processor 202 executing machine readable code instructions of the OTB AI productivity tool 250 in an embodiment may then set the OS 213 for reboot to prompt the BIOS (e.g., 110 of FIG. 1) to decrypt and execute the stored and approved pre-boot machine readable code instructions 281 for the best match responsive capability-with-reboot upon pre-boot of the information handling system into BIOS.

Figure 3:
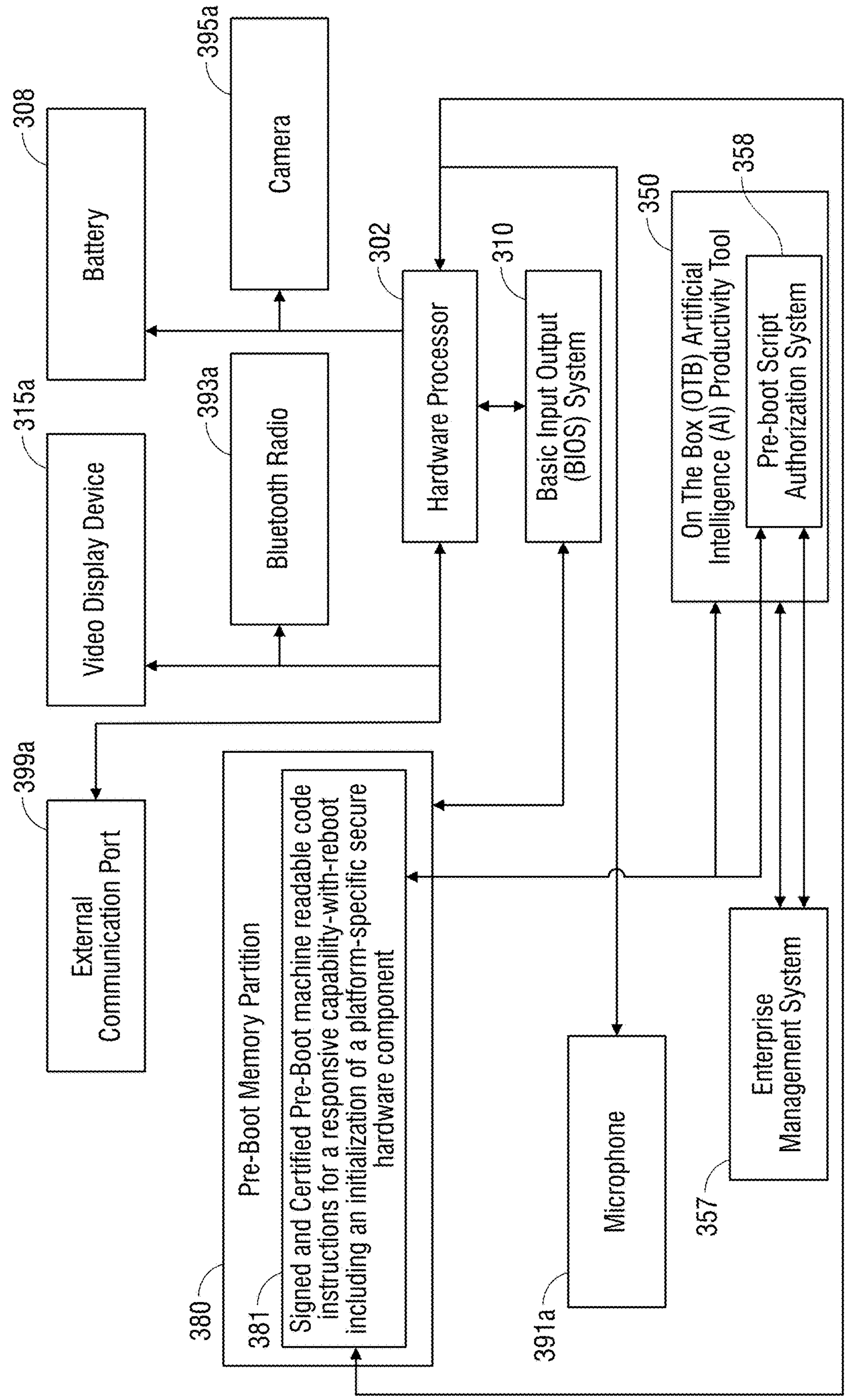
FIG. 3 is a block diagram illustrating an information handling system executing machine readable code instructions for a pre-boot script authorization system of an OTB AI productivity tool directing execution of pre-boot machine readable code instructions for a best match responsive capability requiring reboot via a basic input output system (BIOS) according to an embodiment of the present disclosure.

FIG. 3 is a block diagram illustrating a hardware processor executing machine readable code instructions of an on the box (OTB) artificial intelligence (AI) productivity tool directing execution of pre-boot machine readable code instructions for a responsive capability-with-reboot including initialization of a secure hardware component via a basic input output system (BIOS) according to an embodiment of the present disclosure. As described herein, user queries received at the OTB AI productivity tool 350 in an embodiment may prompt or request functionality of hardware components (e.g., battery 308, display device 215*a*, microphone 391*a*, Bluetooth® radio 393*a*, camera or other type of user identification sensor 395*a*, or external communication port 399*a*) for the information handling system requiring reboot of the operating system (OS) and reinitialization of those hardware components (e.g., 308, 315*a*, 391*a*, 393*a*, 395*a*, or 399*a*).

An enterprise management system 357 that manages the information handling system may have configured the information handling system to disable or limit functionality of the hardware components (e.g., 308, 315*a*, 391*a*, 393*a*, 395*a*, or 399*a*) that are requested or addressed in the received user query. In such cases, the OTB AI productivity tool 350 in an embodiment may require authorization from an ITDM. Machine readable code instructions of a pre-boot script authorization system 358 of the OTB AI productivity tool 350 may direct request and retrieval from the enterprise management system 357 for that authorization for machine readable code instructions 381 of the functions of a responsive capability-with-reboot. In embodiments, that capability-with-reboot may include initialization of those secured hardware components (e.g., 308, 315*a*, 391*a*, 393*a*, 395*a*, or 399*a*) addressed in the user query, rebooting of the operating system, and execution of a basic input output system (BIOS) 310 at the platform level to initialize those hardware components (e.g., 308, 315*a*, 391*a*, 393*a*, 395*a*, or 399*a*) through execution of the received machine readable code instructions 381 for the capability-with-reboot.

The hardware processor 302 executing machine readable code instructions of the OTB AI productivity tool 350 in an embodiment may then set the OS for reboot to prompt the BIOS 310 to execute the stored code instructions 381 on pre-boot. Upon shutting down of the OS, the hardware processor 302 executing machine readable code instructions of the BIOS 310 on reboot in an embodiment may automatically check the pre-boot memory partition 380 for the stored pre-boot machine readable code instructions 381 for the capability-with-reboot including for initialization of the secure hardware component (e.g., 308, 315*a*, 391*a*, 393*a*, 395*a*, or 399*a*). Upon locating the pre-boot machine readable code instructions 381, the hardware processor 302 executing machine readable code instructions of the BIOS 310 may execute the pre-boot machine readable code instructions 381 to initialize the hardware component (e.g., 308, 315*a*, 391*a*, 393*a*, 395*a*, or 399*a*) addressed in the user query input, as authorized and generated by the enterprise management system 357. Upon such a reboot of the OS, the user may then operate the hardware component (e.g., 308, 315*a*, 391*a*, 393*a*, 395*a*, or 399*a*) with capability functions of the capability-with-reboot within the received user query input as requested by the user. The authorization received from and ITDM at the enterprise management system 357 may put restrictions on execution of capability functions of the capability-with-reboot with the secured hardware component. Such restrictions on operation of the capability-with-reboot at the secured hardware component may limit functions permitted, data or files accessible, time duration of access, or number of boot cycles the access is available. In such a way, the hardware processor 302 executing machine readable code instructions for the pre-boot script authorization system 358 of the OTB AI productivity tool 350 in an embodiment may direct request and retrieval from the enterprise management system 357 of machine readable code instructions 381 of a capability-with-reboot for authorization to initialize those secure hardware components (e.g., 308, 315*a*, 391*a*, 393*a*, 395*a*, or 399*a*) for execution of capability functions responsive to the user query. The OTB AI productivity tool 350 may then reboot the operating system to initiate execution of BIOS 310 at the platform level to initialize those hardware components (e.g., 308, 315*a*, 391*a*, 393*a*, 395*a*, or 399*a*) through execution of the received machine readable code instructions 381 of the capability-with-reboot from the pre-boot memory partition 380.

In some cases, this process may be made more secure by ensuring that the hardware processor 302 executing machine readable code instructions of BIOS 310 only executes machine readable code instructions 381 for the capability-with-reboot the may include the initialization of a secure hardware component (e.g., 308, 315*a*, 391*a*, 393*a*, 395*a*, or 399*a*) that have been specifically tailored for execution at the information handling system. For example, when transmitting to the enterprise management system 357 the best match capability-with-reboot identified as responsive to the received user query input, along with the request to authorize and generated pre-boot machine readable code instructions 381 for the capability-with-reboot, specifically tailored limitations for initialization of a secure hardware component (e.g., 308, 315*a*, 391*a*, 393*a*, 395*a*, or 399*a*) may be implemented by an ITDM for execution of capability functions of the best match capability-with-reboot. For example, limitations on functions available under capability functions for the capability-with-reboot may be placed on access to the secure hardware component by the ITDM. For example, a user query input may generate changes to a function of a secured hardware component but may not be permitted to completely remove all security features or permanently disable a secure hardware component in some embodiments. To ensure tailored authorization is executed for the intent information handling system executing the capability-with-reboot, the hardware processor 302 executing machine readable code instructions for a pre-boot script authorization system 358 of the OTB AI productivity tool 350 may append one or more platform specific identifiers for the information handling system to the pre-boot machine readable code instructions 381 for the capability-with-reboot.

In another such embodiment, the enterprise management system 357 may also append within metadata for or directly within the executable code instructions 381, or otherwise attach to the code instructions 381 the same platform-specific ID information received from the pre-boot script authorization system 358 in tandem with the identified best match capability-with-reboot. This may occur when the enterprise management system 357 instead of the information handling system generates the pre-boot machine readable code instructions 381 for the capability-with-reboot. Thus, the OTB AI productivity tool 350 may receive the pre-boot machine readable code instructions 381 generated remotely at the enterprise management system 357 with an ID of the information handling system for which the pre-boot machine readable code instructions 381 have been generated.

The hardware processor 202 executing machine readable code instructions of a pre-boot script authorization system 258 of the OTB AI productivity tool 250 in an embodiment may identify that a responsive capability requires reboot and enterprise management system 257 authorization based on a flag or metadata associated with the responsive capability-with-reboot in a capabilities database. The pre-boot script authorization system 258 may attach platform specific metadata that is specific to the client information handling system 200 and indicating any ITDM authorization or applied limitations to a generated script or machine readable code instructions generated for executing the best match responsive capability-with-reboot responsive to a user query input is specific to that information handling system as well. Example platform specific metadata to information handing system may include a serial number for the information handling system or any components therein, or a device identification number, such as a Dell® Device Identification (DDID) for the information handling system. This platform specific metadata for the best match responsive capability-with-reboot is used to attest that best match responsive capability-with-reboot is specific to this client information handling system to the enterprise management system in embodiments herein for authentication as well as secure exchange, such as via private/public key encryption.

The pre-boot script authorization system 358 operates to request and retrieve authorization for the pre-boot machine readable code instructions 381 for the responsive capability-with-reboot attested with platform specific metadata in embodiments herein. The responsive capability-with-reboot may include initialization of the platform-specific hardware component or capability functions with those platform-specific secure hardware components requiring authorization from the ITDM or enterprise management system 357 via a network interface device. The best match responsive capability-with-reboot identified by the OTB AI productivity tool 350 in an embodiment may be transmitted via the network interface device by the pre-boot script authorization system 358 to the enterprise management system 357 with a request to authorize any generated and transmitted pre-boot machine readable code instructions 381 for the responsive capability-with-reboot that includes initialization of a platform-specific secure hardware component (e.g., securely managed by the enterprise management system to be either enabled or disabled at the information handling system) identified within the best match responsive capability-with-reboot. The enterprise management system 357 may respond by obtaining authorization from an ITDM as well as securing the authorization data with such pre-boot code instructions 381 for the responsive capability-with-reboot, if approved, for the requesting information handling system via an encryption, such as private/public encryption, and transmitting the encrypted pre-boot code instructions 381 for the responsive capability-with-reboot back to the pre-boot script authorization system 358 of the OTB AI productivity tool 350, via the network interface device.

The signed and certified pre-boot code instructions 381 for the responsive capability-with-reboot may be signed with the platform-specific metadata that is specific to the requesting information handling system. The signed and certified pre-boot code instructions 381 for the responsive capability-with-reboot is certified in that in contains IDTM or enterprise approval for access such as to a secure hardware system whose security is managed by the enterprise management system in embodiments herein. This certification may include tailored limitations on what actions may be performed, what data may be accessed, how much time for BIOS access to a hardware device is permitted, or how many reboots are applicable to the authorization in various embodiments. Additionally, the signed and certified pre-boot code instructions 381 for the responsive capability-with-reboot may be encrypted with a public/private key encryption for secure transfer to the information handling system. The machine readable code instructions of the pre-boot script authorization system may receive the signed and certified pre-boot code instructions 381 for the responsive capability-with-reboot and store the same in a designated pre-boot memory partition 380 for access after reboot by BIOS according to various embodiments herein. Upon retrieval of the pre-boot machine readable code instructions 381 from the pre-boot memory partition 380 by the hardware processor 302 executing machine readable code instructions of BIOS 310, the hardware processor 302 executing machine readable code instructions of BIOS 310 may first ensure that the appended platform-specific ID matches identification of the information handling system executing the best match responsive capability-with-reboot before executing the pre-boot machine readable code instructions 381.

In still other aspects of an embodiment, initialization of secure hardware components or other capability functions for a best match responsive capability-with-reboot in response to a received user query input at the OTB AI productivity tool 350 may be further secured by requiring a signed certificate for the pre-boot machine readable code instructions 381 for the best match responsive capability-with-reboot. For example, the pre-boot machine readable code instructions 381 of the best match responsive capability-with-reboot, with the platform-specific identifier as a signature in various embodiments herein, may be transmitted to the enterprise management system 357 with a cloud-based script authorization service therefor for the certification of the pre-boot machine readable code instructions 381 by an ITDM as described above. The enterprise management system 357 may then encrypt the signed and certified pre-boot machine readable code instructions 381 for the best match responsive capability-with-reboot with a private key and transmit the encrypted signed and certified pre-boot machine readable code instructions 381 for the best match responsive capability-with-reboot to the information handling system for storage at the pre-boot memory partition 380.

In such an example embodiment, the OTB AI productivity tool 350 may receive an encryption signed and certified version of the pre-boot machine readable code instructions 381, with a private key. Upon retrieval of the pre-boot machine readable code instructions 381 from the pre-boot memory partition 380 by the BIOS 110, the hardware processor 302 executing machine readable code instructions of BIOS 310 in such an example embodiment may first provide a public key provisioned within BIOS 310 matching or corresponding to the private key for the encryption signed and certified pre-boot machine readable code instructions 381 to access the script. The hardware processor 302 executing machine readable code instructions of BIOS 310 may then execute the pre-boot machine readable code instructions 381 for the best match responsive capability-with-reboot to initialize the secure hardware component and perform capability functions addressed within the received user query input. In such a way, the OTB AI productivity tool in an embodiment may direct execution of the BIOS to initialize enterprise-managed secure hardware components through execution of the received pre-boot machine readable code instructions received from the enterprise in a secure fashion.

The hardware processor 302 in an embodiment may also execute machine readable code instructions of BIOS 310 to initialize other hardware components not addressed in the best match responsive capability-with-reboot that is responsive to a received user query input. The hardware processor 302 may execute machine readable code instructions of the BIOS 310 to complete the reboot process, which may include the normally performed initialization of hardware components that do not require authorization of the enterprise management system 357, such as a display device, a cooling device, or pre-authorized external communication ports, for example. The hardware processor 302 in an embodiment may then execute machine readable code instructions of BIOS 310 to load and boot to the OS of the information handling system. For example, the hardware processor 302 may execute code instructions of BIOS 310 to load the OS within volatile memory and boot to those loaded OS code instructions. Upon such a reboot of the OS, the user may then operate the hardware component (e.g., 308, 315*a*, 391*a*, 393*a*, 395*a*, or 399*a*) addressed within the received user query input as requested by the user, if authorized by the enterprise management system 357 within authenticated pre-boot machine readable code instructions 381 for the initializing the secure hardware component (e.g., 308, 315*a*, 391*a*, 393*a*, 395*a*, or 399*a*).

Figure 4:
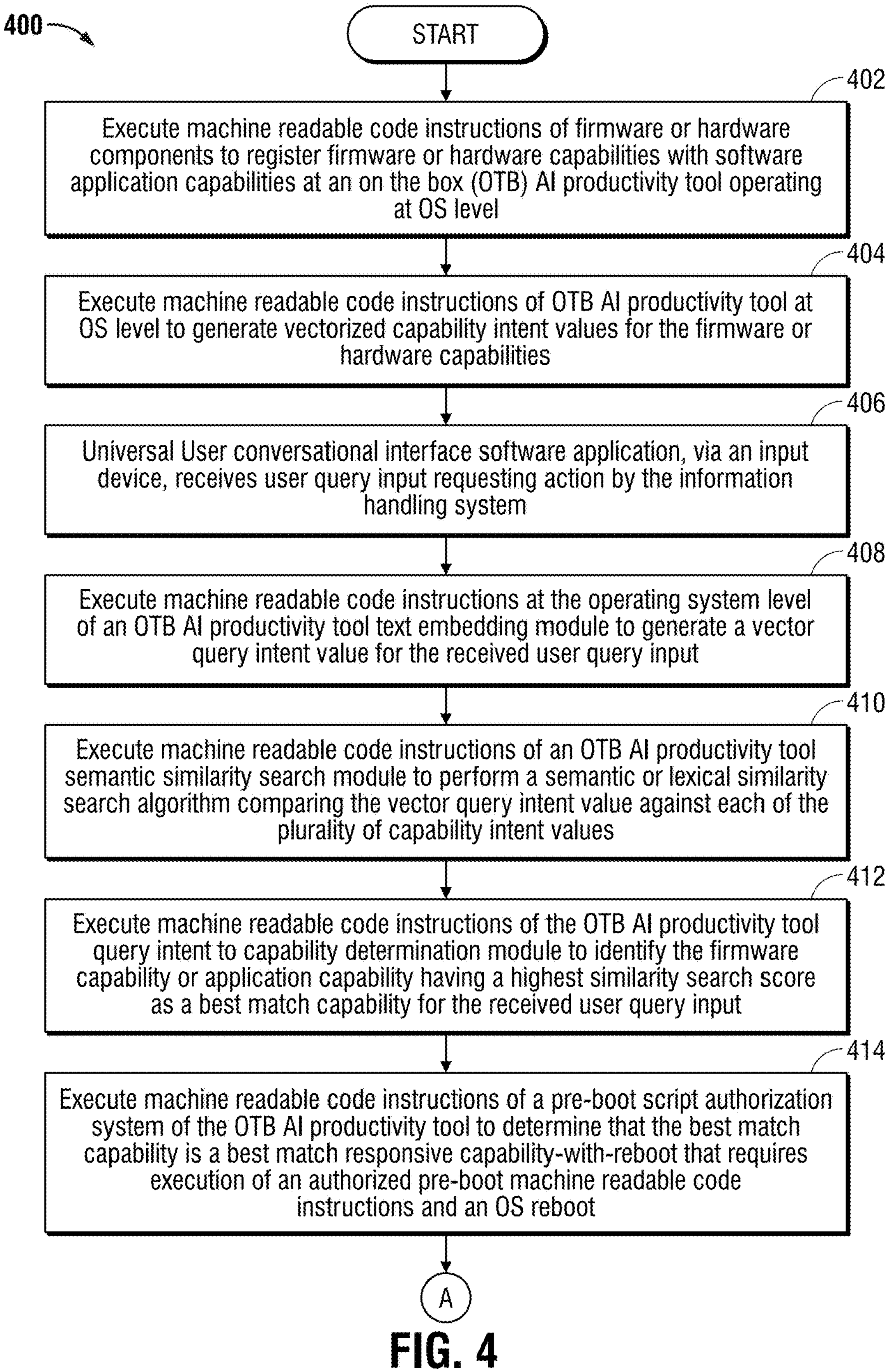
FIG. 4 is a flow diagram illustrating a method of executing machine readable code instructions for identifying a best match responsive capability requiring reboot for a received user query input according to an embodiment of the present disclosure.
Figure 4:
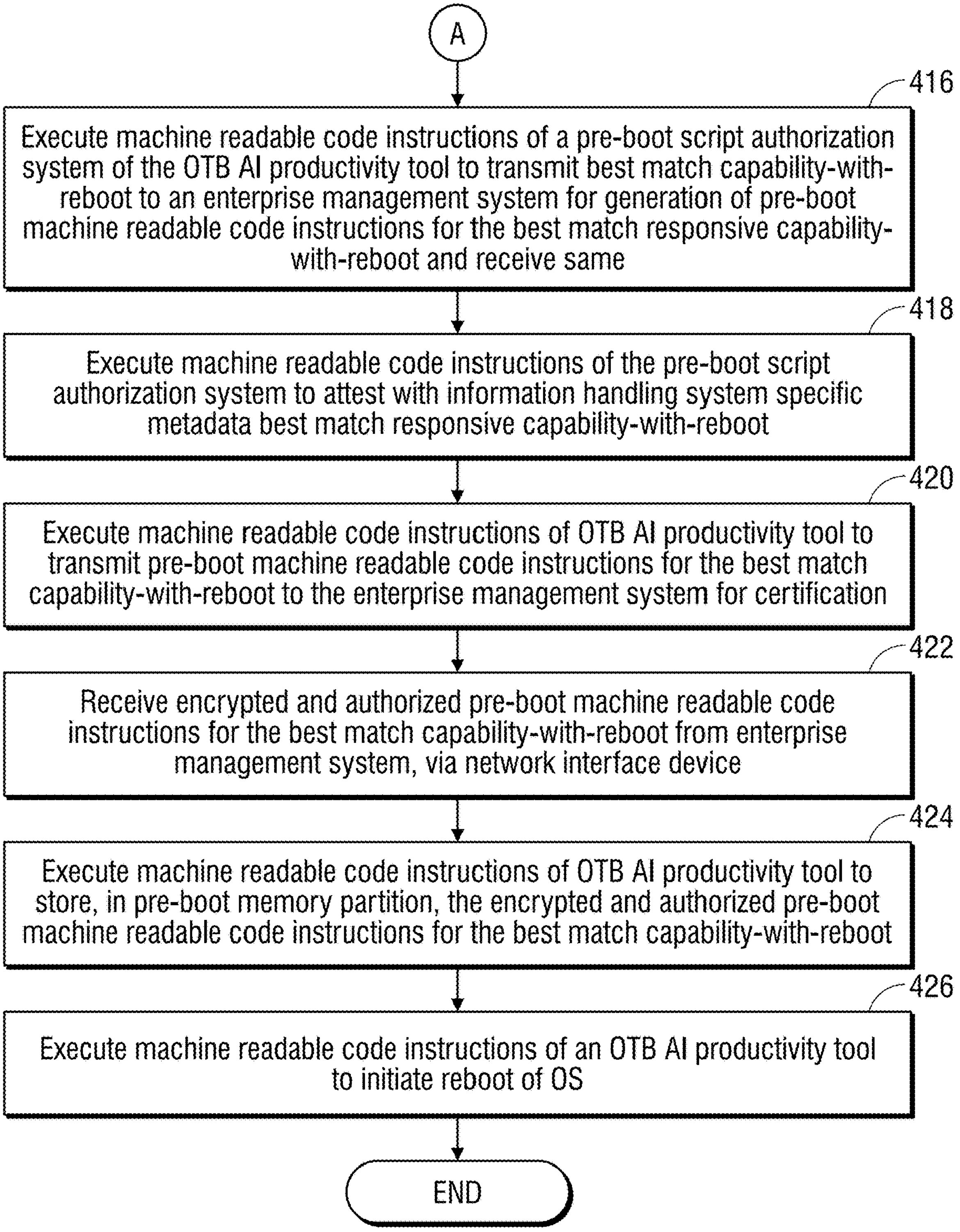

FIG. 4 is a flowchart illustrating a method of executing machine readable code instructions for identifying a best match capability-with-reboot for firmware or hardware for a received user query input requiring rebooting and pre-boot execution of capability functions such as initialization of a secure hardware component and requiring authorization from an enterprise management system according to an embodiment of the present disclosure. As described herein, user queries received at the OTB AI productivity tool may prompt or request functionality of hardware components for the information handling system requiring reboot of the operating system (OS) and reinitialization of those hardware components. An enterprise management system that manages the information handling system may have configured the information handling system to disable or limit functionality of the hardware components addressed in the received user query. In such cases, a pre-boot script authorization system of the OTB AI productivity tool in an embodiment may direct request and retrieval from the enterprise management system of generated machine readable code instructions for execution of a best match responsive capability-with-reboot. This best match responsive capability-with-reboot may include initialization of those secure hardware components addressed in the user query and whose security is managed by an enterprise management system and ITDM. Further, the pre-boot script authorization system of the OTB AI productivity tool in an embodiment may sign with platform specific identifier metadata and request authorization for execution of the pre-boot machine readable code instruction of the best match responsive capability-with-reboot from the enterprise management system. Upon receipt of the encryption signed, and certified pre-boot machine readable code instructions for the best match responsive capability-with-reboot and storage at a pre-boot memory partition, the OTB AI productivity tool may proceed with rebooting of the operating system. Upon reboot, execution of a basic input output system (BIOS) at the platform level may execute the best match responsive capability-with-reboot to, for example, initialize those hardware components or perform other capability functions through execution of the received machine readable code instructions. The certification authorizing the execution of the best match responsive capability-with-reboot may be restrictions or limitations on the operation of capability function or access to secured hardware components in example embodiments.

At block 402, a hardware processor may execute machine readable code instructions operating to register firmware or hardware capabilities with an on the box (OTB) AI productivity tool operating at OS level. A hardware processor executing code instructions of the OTB AI productivity tool in an embodiment may receive user queries via an input/output device such as a keyboard, microphone, or video camera, described herein as user query inputs. The OTB AI productivity tool may match received user query inputs to known firmware or hardware components via an available capabilities database. The natural language capabilities database and corresponding entries in a capability intent values database may include available firmware or hardware capabilities for one or more hardware components executable at the platform level. A capabilities gathering module of an OTB AI productivity tool may gather capabilities of AI productivity tool-enableable software applications as well as from the firmware or hardware components at a platform level. The hardware processor executing code instructions of the OTB AI productivity tool may then direct execution of these software, firmware or hardware capabilities. This may include execution of responsive capabilities for firmware or hardware at the platform level based on similarity matching with a user query input received at the OTB AI productivity tool at the OS level.

Prior to such a process and prior to a user providing such a user query input into an OTB AI productivity tool at the OS level, hardware components or firmware may register capabilities via the capabilities gathering module with the OTB AI productivity tool firmware or hardware capabilities achievable by one or more versions of firmware for hardware components at the platform level. Such a registration of firmware or hardware capabilities at an OTB AI productivity tool may take into account current configurations and policies of the various firmware, or those hardware components, as set by an information technology decision maker (ITDM) managing a plurality of information handling system within an enterprise system. The ITDM for enterprises may issue a policy setting configurations for a plurality of information handling systems within the enterprise to control functionality of various firmware or hardware components at individual information handling systems. In some cases, these policies may disable or limit functionality of one or more hardware components. For example, ITDMs within an enterprise management system may enable, disable or control specific functionality for an external communication port, such as a universal serial bus (USB) drive, a camera, a user identification sensor, such as a fingerprint, voice, or iris scanner, or one or more radios, such as a Bluetooth® radio. Changing functionality of any of these hardware components, such as by enabling user access to a secured external communication port, a secured camera, or a secured radio (e.g., as secured by an ITDM disabling user access previously), or by disabling a user identification sensor for quicker and easier access by the user to the information handling system may require approval by the ITDM or enterprise management system and reinitialization of the hardware component at issue. This may be required for execution of any responsive firmware or hardware capabilities, including any best match responsive capabilities-with-reboot that require reboot to BIOS to execute. Reinitialization of the hardware component in embodiments may involve closing the operating system (OS), executing a pre-boot script or machine readable code instructions for initializing the hardware component with the requested and ITDM approved new configuration (e.g., disabling, enabling, limiting access, or other) for the hardware component at issue, and rebooting the OS. In embodiments where ITDM or enterprise management system authorization is required in order to execute an identified firmware or hardware capability, metadata for that firmware or hardware capability may include a flag or notification for the OTB AI productivity tool of such a requirement. Authorization from an ITDM may include various restrictions on access or capability functions with the secure hardware components pursuant to the best match responsive capability-with-reboot in embodiments herein.

These firmware or hardware capabilities (also called capability intents and having capability intent values) may describe those functionalities of each of one or more versions of firmware for one or more hardware components that may be executed when interfacing with the OTB AI productivity tool. Natural language descriptions of the firmware or hardware capabilities may be stored within a natural language capability database for comparison to received user query inputs, for example, in order to identify a firmware or hardware capability, such as a best match responsive capability-with-reboot, most likely to address a user's request within the received user query inputs.

In an embodiment at block 404, the hardware processor may execute machine readable code instructions of OTB AI productivity tool at the OS level to generate vectorized capability intent values for the natural language descriptions of firmware or hardware capabilities. For example, in an embodiment, each of the firmware or hardware capabilities stored at the capability intent values database, may have a description with text descriptors, may be associated with a unique ID, and may have a capability intent value generated based on those text descriptors via execution of a capability intent value generator of the OTB AI productivity tool in an embodiment.

Upon registration of a firmware or hardware capability, including any capabilities-with-reboot, in an embodiment, a hardware processor for the information handling system may execute machine readable code instructions of a natural language capability intent module utilizing one or more text embedding algorithms of a text embedding module to generate a multi-axis vector capability intent value for that capability, including firmware or hardware capabilities that is based on text descriptors for that capability. Each axis of the multi-axis vector space may provide a measurement of various attributes of a text excerpt that are known to provide context or semantic understanding of the text. Further, each of these firmware or hardware capability intent values generated by the text embedding module for association with these firmware or hardware capabilities, including capabilities-with-reboot, may also be associated with a capability identification value or capability ID such as an alphanumeric ID that may identify, uniquely, each of these firmware or hardware capabilities in the capability intent values database, for example. In such a way, the vectorized user query input intent value and capability intent values may mathematically represent a reader's contextual or semantic understanding of the capability natural language text descriptors as well as for a user query input to allow for semantic as well as lexical comparison in some embodiments as described below.

The hardware processor at block 406 in an embodiment executing machine readable code instructions for the universal user conversational interface software application may receive, via an input device, a user query input requesting action by the information handling system. For example, in embodiments described herein, a user may provide text or voice data (e.g., via any IO device such as a microphone) to a universal user conversational interface software application operating as a chatbot to simulate a conversation between the user and the OTB AI productivity tool.

At block 408 in an embodiment, the hardware processor may execute machine readable code instructions at the operating system level of an OTB AI productivity tool text embedding module to generate a vector query intent value for the received user query input according to embodiments herein. For example, in an embodiment, a hardware processor may execute machine-readable code instructions of the query intent determination module for the OTB AI productivity tool to receive the user query input via microphone, image, or text input, and initiate execution of machine readable code instructions for an intent recognition pipeline machine learning module.

The hardware processor in an embodiment at block 410 may execute machine readable code instructions of an OTB AI productivity tool semantic similarity search module to perform a semantic or lexical similarity search algorithm comparing the vector query intent value against each of the plurality of capability intent values, including for capabilities-with-reboot having firmware or hardware capability intent values associated with firmware or hardware components and managed by an enterprise management system. For example, a hardware processor may execute machine readable code instructions for a semantic similarity search module, via a query intent to capability determination module, that compares the vectorized user query input intent value and the capability intent values stored within the capability intent values database. Such a comparison may be performed using a semantic search machine learning model, such as a cosine or other semantic similarity search algorithm, that compares the distance or value difference or angular differences in a multi-axis vector space between two vectors to determine the contextual similarity between the firmware or hardware capability intent values and the user query input intent value generated from an embedded user query. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability intent values and query intent vector value. The cosine similarity search comparison or other semantic similarity search algorithm may be performed for several of the capability intent values stored within the capability intent value database to identify a best match responsive capability-with-reboot that is a highest or threshold-level cosine semantic search score for either initial or updated capability intent value that sufficiently or most closely matches as responsive to the user query input value, according to embodiments herein.

At block 412 in an embodiment, the hardware processor may execute machine readable code instructions of an OTB AI productivity tool query intent to capability determination module to identify the one or more responsive capabilities including one or more best match responsive capability-with-reboot for firmware or a hardware component. An AI productivity tool-enableable software capability, or a firmware or hardware capability, including a capability-with-reboot, having a highest similarity search score or a similarity search score meeting a threshold similarity search score level as the best match capability for the received user query input. For example, the hardware processor in an embodiment may execute machine readable code instructions of an OTB AI productivity tool query intent to capability determination module to identify the available firmware or hardware capability having a highest semantic similarity search score that meets a minimum threshold value (e.g., 0.5, 0.7, 0.9) as the best match capability for the received user query input in an embodiment. In an embodiment, the hardware processor may execute machine readable code instructions of an OTB AI productivity tool query intent to capability determination module identifies the one or more best match responsive capabilities-with-reboot.

The hardware processor at block 414 in an embodiment may execute machine readable code instructions for a pre-boot script authorization system of the OTB AI productivity tool to determine that a best match capability-with-reboot requires reboot to BIOS and execution of pre-boot machine readable code instructions for initialization of a platform-specific secure hardware component or other capability function in BIOS. As described herein, in some cases the identified best match capability-with-reboot that is responsive to address the user request within the user query input may require getting ITDM or enterprise management system approval. Further, the identified best match capability-with-reboot may require closing the operating system (OS) and executing a pre-boot script or machine readable code instructions for initializing the hardware component with ITDM approved new configuration (e.g., disabling, enabling, limiting access, or other) for the hardware component at issue upon rebooting to BIOS. In such cases, the best match capability-with-reboot responsive to the user's query input may include metadata that notifies pre-boot script authorization system of the OTB AI productivity tool that that reboot is required and that an ITDM or enterprise management system authorization is required for execution of the capability. The hardware processor in such an embodiment may execute machine readable code instructions for the pre-boot script authorization system of the OTB AI productivity tool to identify these flag or other notification that reboot or ITDM authorization is required. best match capability-with-reboot At block 416, the hardware processor in an embodiment may execute machine readable code instructions for the pre-boot script authorization system of the OTB AI productivity tool to transmit the best match capability-with-reboot to the enterprise management system for generation of pre-boot machine readable code instructions for that best match capability-with-reboot. Many AI productivity tools or chat-bots can only execute machine readable code instructions during the same user boot session within the OS in which it receives the user request to do so. In other words, these AI productivity tools cannot direct execution of code instructions once the OS has been rebooted into a pre-boot operation of BIOS. This disallows for execution of a best match responsive capability requiring reboot and execution of the required pre-boot script or machine readable code instructions such as for initializing the hardware component for access to the same as described herein. The OTB AI productivity tool in embodiments of the present disclosure address this issue by requesting and retrieving the pre-boot script or machine readable code instructions for the best match capability-with-reboot, such as for initialization or execution of capability functions with the secure hardware component from the ITDM or enterprise management system. In other embodiments herein, the pre-boot script or machine readable code instructions for the best match capability-with-reboot may be generated or available on the box of the client information handling system and only transferred to the remote enterprise management system for certification as authorized.

The best match hardware capability identified by the OTB AI productivity tool in an embodiment herein may be transmitted by the OTB AI productivity tool to the enterprise management system with a request to generate and transmit pre-boot machine readable code instructions for the best match capability-with-reboot including initialization of a secure hardware component (e.g., securely managed by the enterprise management system to be either enabled, disabled, or otherwise restricted at the information handling system). The enterprise management system may respond by generating such pre-boot script or machine readable code instructions for the best match responsive capability-with-reboot, if approved for the requesting information handling system. Then, the enterprise management system may transmit the generated pre-boot machine readable code instructions for the best match responsive capability-with-reboot back to the pre-boot script authorization system of the OTB AI productivity tool. As described, in other embodiments, the pre-boot script or machine readable code instructions for the best match capability-with-reboot may be generated or retrieved at the information handling system on the box.

At block 418, this process may be made more secure by ensuring that the hardware processor executing machine readable code instructions of BIOS only executes pre-boot script or machine readable code instructions for the best match responsive capability-with-reboot including for initialization of a secure hardware component that have been specifically tailored for execution at the information handling system receiving the user query input. For example, when transmitting to the enterprise management system the pre-boot script or machine readable code instructions for the best match responsive capability-with-reboot identified as responsive to the received user query input, along with the request to authorize execution of the pre-boot machine readable code instructions the best match responsive capability-with-reboot, the hardware processor executing machine readable code instructions of the OTB AI productivity tool may append one or more platform-specific identifiers for the information handling system. More specifically, the hardware processor executing machine readable code instructions of the OTB AI productivity tool may append a MAC address, serial number for a motherboard or other hardware component (e.g., hardware processor), enterprise assigned ID for the information handling system, or enterprise assigned service tag for the information handling system to the pre-boot script or machine readable code instructions for the best match responsive capability-with-reboot. This appended platform-specific device identification metadata specific to the information handling system signs or attests the pre-boot script or machine readable code instructions for the best match responsive capability-with-reboot as specific to that information handling system during later execution at BIOS after reboot. Further, it ensures that authorization limitations such as limits on capability functions, time limits, reboot cycles or others that may be applied to the pre-boot script or machine readable code instructions for the best match responsive capability-with-reboot for the information handling system by the ITDM are applied.

In some embodiments, the enterprise management system may also append within metadata for or directly within the executable code instructions, or otherwise attach to the code instructions the same platform-specific device ID information received from the OTB AI productivity tool in tandem with the identified best match responsive capability-with-reboot to remotely generate pre-boot script or machine readable code instructions. Thus, the OTB AI productivity tool may later receive the pre-boot machine readable code instructions with a platform-specific ID of the information handling system for which the pre-boot machine readable code instructions have been generated.

At block 420 in an embodiment, the hardware processor may execute machine readable code instructions of OTB AI productivity tool to transmit the pre-boot script or machine readable code instructions for the best match responsive capability-with-reboot to the enterprise management system for certification as authorized by an ITDM with applied restrictions, via a network interface device. After review by the ITDM and a cloud script authorization service, authorization data including any enabling, disabling, or applied restrictions may be included with certification of the pre-boot script or machine readable code instructions for the best match responsive capability-with-reboot at the enterprise management system. In some example embodiments, execution of pre-boot script or machine readable code instructions for the best match responsive capability-with-reboot in response to a received user query input at the OTB AI productivity tool may be further secured by requiring a signed certificate for the pre-boot machine readable code instructions with the platform-specific identifier in metadata. For example, the platform-specific identifier with the optional platform-specific identifier in various embodiments herein may be transmitted by the pre-boot script authorization system of the OTB AI productivity tool, via the network interface device, to the enterprise management system with the cloud-based script authorization service therefor for certification of the pre-boot machine readable code instructions to include ITDM authorization data and limitations.

In an embodiment at block 422, the OTB AI productivity tool may receive, via the network interface device, a signed and certified pre-boot script or machine readable code instructions for the best match responsive capability-with-reboot from enterprise management system that may include initialization or other capability functions with the platform-specific secure hardware component identified in best match responsive capability. For example, as described directly above, in some embodiments, the hardware processor executing machine readable code instructions of the OTB AI productivity tool may transmit, via the network interface device, the pre-boot machine readable code instructions to the enterprise management system or to a cloud-based script authorization service therefor for certification by authorization by a cloud based authorization service. The enterprise management system may then apply an encryption to the pre-boot script or machine readable code instructions for the best match responsive capability-with-reboot with a private-public key encryption. In such a case, the OTB AI productivity tool may receive, via the network interface device, a signed and certified version of the pre-boot machine readable code instructions, with a private key that may be compared against a public key stored in BIOS for the information handling system to decrypt and authenticate the pre-boot script or machine readable code instructions for the best match responsive capability-with-reboot received from the enterprise management system.

At block 424, the hardware processor in an embodiment may execute machine readable code instructions of OTB AI productivity tool to store in pre-boot memory partition the encrypted and authorized pre-boot script or machine readable code instructions for the best match responsive capability-with-reboot responsive to the received user query input for later access by BIOS upon reboot. Upon receipt of the enterprise approved and encrypted pre-boot script or machine readable code instructions for the best match responsive capability-with-reboot responsive to the received user query input, encrypted pre-boot script or machine readable code instructions for the best match responsive capability-with-reboot may be stored by the hardware processor executing machine readable code instructions of pre-boot authorization system of the OTB AI productivity tool within a pre-boot memory partition. That pre-boot memory partition is formed according to embodiments herein and is accessible by the OTB AI productivity tool as well as a BIOS after reboot of the information handling system. For example, the pre-boot memory partition may be a partition within non-volatile (NV) static memory, such as NV random access memory (NV-RAM), BIOS RAM or within a system file of static memory or a memory drive, or may be an extensible firmware interface (EFI) partition of NV memory. The hardware processor executing machine readable code instructions of BIOS and OTB AI productivity tool may access such NV memory to store and retrieve the enterprise authorized and encrypted pre-boot machine readable code instructions via an inter-connected inter-integrated circuit (I2C) communication protocol, such as a sideband channel, for example.

The hardware processor executing machine readable code instructions of the OTB AI productivity tool in an embodiment at block 426 may then set the OS for reboot to prompt the BIOS to execute the stored pre-boot machine readable code instructions for initializing the secure hardware component addressed within the received user query on reboot into BIOS for pre-boot operation in BIOS before full boot to OS. The method for identifying a best match responsive capability-with-reboot for a received user query input requiring execution of pre-boot machine readable code instructions on reboot to BIOS and authorization from an enterprise management system may then end. In such a way, the OTB AI productivity tool in an embodiment herein may direct request and retrieval from the enterprise management system of authorization of execution for machine readable code instructions for an identified best match responsive capability-with-reboot, such as including initialization of secure hardware components, that is responsive to the user query.

Figure 5:
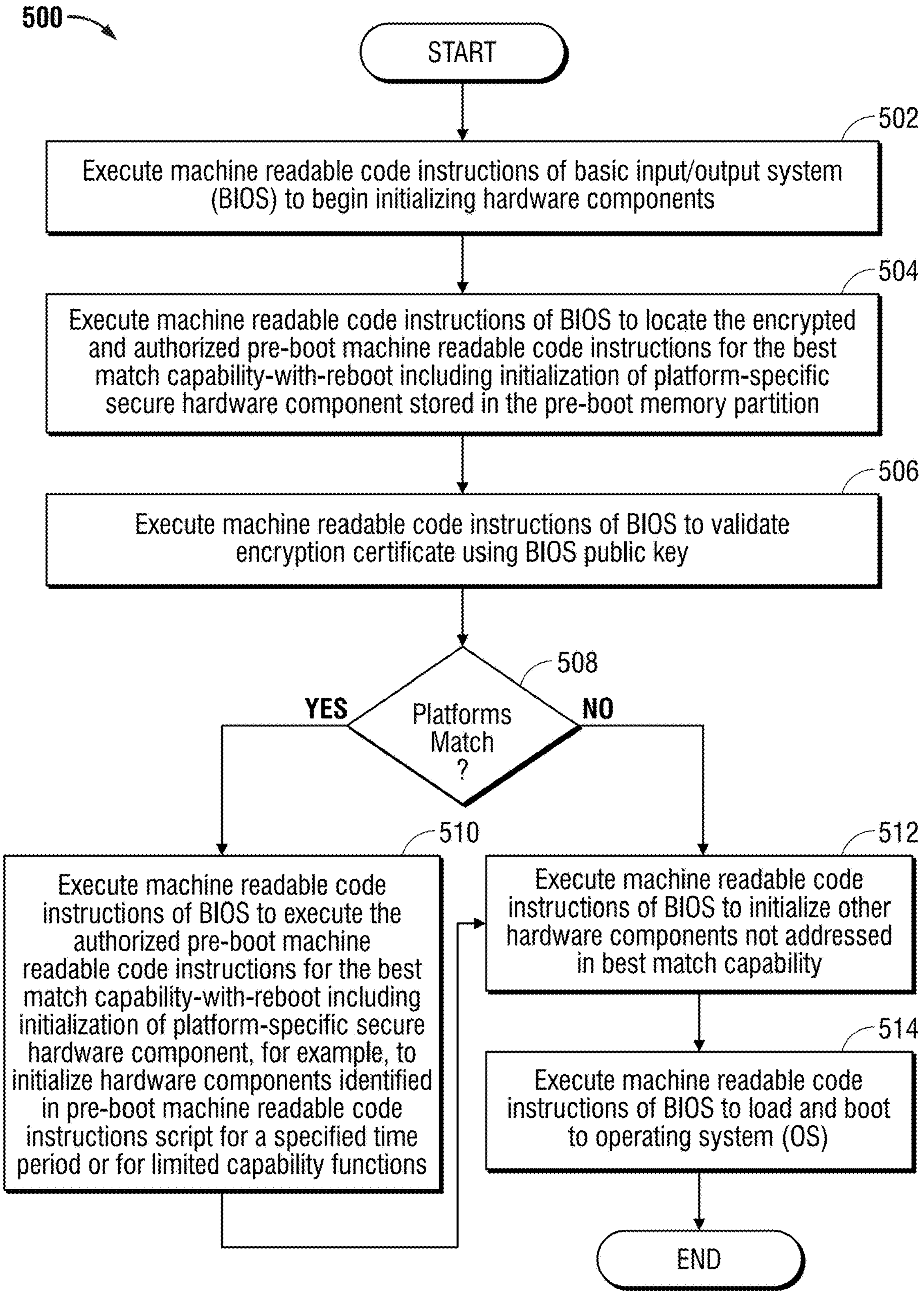
FIG. 5 is a flow diagram illustrating a method of executing machine readable code instructions directing execution, in response to a user query input received via an OTB AI productivity tool, of pre-boot machine readable code instructions for best match responsive capability requiring reboot via BIOS according to an embodiment of the present disclosure.

FIG. 5 is a flow diagram illustrating a method of directing execution, via a hardware processor executing machine readable code instructions of an on the box (OTB) artificial intelligence (AI) productivity tool and in response to a user query input, of pre-boot script or machine readable code instructions for the best match responsive capability-with-reboot via a basic input output system (BIOS) according to an embodiment of the present disclosure. As described herein, user queries received at the OTB AI productivity tool may prompt or request functionality of hardware components for the information handling system requiring reboot of the operating system (OS) to BIOS and reinitialization of those hardware components. An enterprise management system that manages the information handling system may have configured the information handling system to disable or limit functionality of the hardware components addressed in the received user query. In such cases, machine readable code instructions of a pre-boot script authorization system of the OTB AI productivity tool in embodiments herein may direct request and retrieval from the enterprise management system of pre-boot script or machine readable code instructions for the best match responsive capability-with-reboot that is responsive to the user query. Further, the OTB AI productivity tool may cause rebooting of the operating system, as described in greater detail above with respect to FIG. 4. Upon shutting down of the OS at the end of that process, the OTB AI productivity tool may also direct execution of a basic input output system (BIOS) at the platform level to initialize those hardware components through execution of pre-boot script or machine readable code instructions for the best match responsive capability-with-reboot for initialization of secure hardware components previously received from an enterprise management system and stored at a pre-boot memory partition.

At block 502 in an embodiment, a hardware processor may execute machine readable code instructions of BIOS, after a reboot, to begin initializing hardware components for the information handling system. As described herein, following retrieval from the enterprise management system of pre-boot script or machine readable code instructions for the best match responsive capability-with-reboot that addresses a user query received by an OTB AI productivity tool, a hardware processor may execute machine readable code instructions of the OTB AI productivity tool to shut down the OS. In doing so, the hardware processor executing machine readable code instructions of the OTB AI productivity tool may prompt a restart or reboot of the OS. When such a reboot process begins, the hardware processor may first, as part of this reboot process, execute machine readable code instructions of BIOS to execute any stored pre-boot script or machine readable code instructions for the best match responsive capability-with-reboot, such as for initialization of hardware components for the information handling system, from the pre-boot partition memory.

The hardware processor in an embodiment at block 504 may execute machine readable code instructions of BIOS to locate signed and certified pre-boot script or machine readable code instructions for the best match responsive capability-with-reboot including for initialization of platform-specific secure hardware component that are stored in pre-boot memory partition. As described herein, upon receipt of the enterprise approved pre-boot script or machine readable code instructions for the best match responsive capability-with-reboot including for initialization of the secure hardware component (e.g., input/output device, network interface device, microphone, external communication port) that is identified as responsive to the received user query input, those retrieved code instructions may be stored within a pre-boot memory partition that is accessible by the OTB AI productivity tool and a BIOS for the information handling system. The hardware processor executing machine readable code instructions of BIOS may access such NV memory to retrieve the pre-boot machine readable code instructions via an inter-connected inter-integrated circuit (I2C) communication protocol, such as a sideband channel, for example.

At block 506, the hardware processor in an embodiment may execute machine readable code instructions of BIOS to validate an encryption certificate using a BIOS public key. As described herein, the OTB AI productivity tool may receive, via the network interface device, a signed and certified version of the pre-boot machine readable code instructions, with a private key. Upon retrieval of the pre-boot script or machine readable code instructions for the best match responsive capability-with-reboot from the pre-boot memory partition by the BIOS, the hardware processor executing machine readable code instructions of BIOS in such an example embodiment may first provide a public key provisioned within BIOS matching or corresponding to the private key for the signed and certified pre-boot machine readable code instructions to access the script. The hardware processor executing machine readable code instructions of BIOS may then execute the pre-boot script or machine readable code instructions for the best match responsive capability-with-reboot and, for example, initialize the secure hardware component addressed within response to the received user query input only if the certificate can be authenticated with the public key. This initiation may include various limitations on access set forth in included ITDM authorization data or instructions with the pre-boot script or machine readable code instructions for the best match responsive capability-with-reboot according to various embodiments herein.

The hardware processor in an embodiment at block 508 executing code instructions of BIOS may determine whether the pre-boot script or machine readable code instructions for the best match responsive capability-with-reboot located at block 504 have been tailored to the information handling system executing BIOS. As described herein, in some embodiments, the enterprise management system may append within metadata for or directly within the pre-boot script or machine readable code instructions for the best match responsive capability-with-reboot metadata with platform-specific ID information to identify the specific information handling system for which the pre-boot script or machine readable code instructions for the best match responsive capability-with-reboot have been generated for a received user query input. Upon retrieval of the pre-boot machine readable code instructions from the pre-boot memory partition by the hardware processor executing machine readable code instructions of BIOS, the hardware processor executing machine readable code instructions of BIOS may first ensure that the appended platform-specific ID matches identification of the information handling system before executing the pre-boot script or machine readable code instructions for the best match responsive capability-with-reboot.

If the platform-specific ID for the information handling system matches identification of the information handling system given within or attached to the pre-boot script or machine readable code instructions for the best match responsive capability-with-reboot, the pre-boot machine readable code instructions for initialization of the secure hardware component may be safe to execute, and the method may proceed to block 510 for such an execution. If the platform-specific ID for the information handling system does not match identification of the information handling system given within or attached to the pre-boot machine readable code instructions for initialization of the secure hardware component, the pre-boot script or machine readable code instructions for the best match responsive capability-with-reboot may not be safe or correct to execute, and the method may proceed to block 512 for initialization of other hardware components and boot to OS without execution of the pre-boot script or machine readable code instructions for the best match responsive capability-with-reboot.

In an embodiment at block 510 in the platform-specific ID for the information handling system matches identification of the information handling system given within or attached to the pre-boot script or machine readable code instructions for the best match responsive capability-with-reboot including for initialization of the secure hardware component. At block 510, the hardware processor may execute the machine readable code instructions of BIOS to execute the signed and certified pre-boot script or machine readable code instructions for the best match responsive capability-with-reboot. This execution may operate to initialize a platform-specific secure hardware component identified in a best match responsive capability-with-reboot identified as responsive to a received user query input to initialize hardware components. Such an initialization may enable, disable, or have restricted access to such a secure hardware component in some embodiments. Examples of the authorized initiation may include limitations on actions available at the secure hardware component, limitations on data accessible, limitations for a period of time, or limitations for a number of boot sessions allowed within the authorization data for the pre-boot script or machine readable code instructions for the best match responsive capability-with-reboot to initialize the secure hardware component, as received by the enterprise management system. For example, such pre-boot script or machine readable code instructions for the best match responsive capability-with-reboot including for initializing the secure hardware component may direct the BIOS to perform such an initialization for only the next boot session, such that the secure hardware component that is initialized only remains useable or enabled until the next time the OS is shut down. As another example, such pre-boot script or machine readable code instructions for the best match responsive capability-with-reboot including for initializing the secure hardware component may direct the BIOS to perform such an initialization for only a defined period of time, such as an hour, a day, or a week. In such a case, the BIOS may only enable the secure hardware process during boot sessions occurring within that defined time frame. As yet another example, such pre-boot script or machine readable code instructions for the best match responsive capability-with-reboot including for initializing the secure hardware component may direct the BIOS to only permit certain capability functions or access to particular data files while still restricting others during such an initialization and operation of a secured hardware component. In such a case, the BIOS may only enable the secure hardware process for certain actions with the secure hardware component during boot sessions. In such a way, the OTB AI productivity tool in an embodiment may direct execution of the BIOS to execute pre-boot script or machine readable code instructions for the best match responsive capability-with-reboot including to initialize enterprise-managed secure hardware components subject to authorization received from the enterprise in a secure fashion.

At block 512, the hardware processor in an embodiment may execute machine readable code instructions of BIOS to initialize other hardware components not addressed in the best match capability that is responsive to a received user query input. This may occur in an embodiment in which the pre-boot script or machine readable code instructions for the best match responsive capability-with-reboot have already been executed, as described directly above, or in an embodiment in which the platform-specific ID for the information handling system does not match identification of the information handling system given within or attached to the pre-boot machine readable code instructions. In either scenario, the hardware processor may execute machine readable code instructions of the BIOS to complete the reboot process, which may include the normally performed initialization of hardware components that do not require authorization of the enterprise management system, such as a display device, a cooling device, or pre-authorized external communication ports, for example.

The hardware processor in an embodiment at block 514 may execute machine readable code instructions of BIOS to load and boot to the OS of the information handling system. For example, the hardware processor may execute code instructions of BIOS to load the OS within volatile memory and boot to those loaded OS code instructions. Upon such a reboot of the OS, the user may then operate the hardware component addressed within the received user query input as requested by the user, if authorized by the enterprise management system within authenticated pre-boot script or machine readable code instructions for the best match responsive capability-with-reboot, such as for the initializing and conducting capability responsive functions with the secure hardware component. The method for directing execution of pre-boot script or machine readable code instructions for the best match responsive capability-with-reboot after reboot via an OTB AI productivity tool and in response to a user query input may then end.

The blocks of the flow diagram of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system managed by an enterprise management system and operating an on the box (OTB) artificial intelligence (AI) productivity tool comprising:

a hardware processor executing machine readable code instructions to generate vectorized capability intent values from natural language descriptions of firmware or hardware capabilities, wherein the firmware or hardware capabilities include a capability-with-reboot requiring reboot to basic input/output system (BIOS) for execution, and to generate a vectorized query input intent value for a user query input received via the OTB AI productivity tool, wherein the user query request action on behalf of the information handling system;

the hardware processor executing machine readable code instructions to perform a semantic similarity search by comparing the vectorized query input intent value to the vectorized capability intent values to identify a best match capability-with-reboot for the received user query input, wherein the best match capability-with-reboot has a capability intent value that generates a threshold level semantic similarity search score and requiring authorization for execution of pre-boot machine readable code instructions of the capability-with-reboot, wherein the authorization includes initialization of a secure hardware component received from the enterprise management system;

a network interface device to transmit the best match capability to the enterprise management system and to receive the authorization for the pre-boot machine readable code instructions of the capability-with-reboot included for the best match capability-with-reboot;

the hardware processor executing machine readable code instructions to store the received pre-boot machine readable code instructions of the capability-with-reboot included for initialization of the secure hardware component in a pre-boot memory partition, wherein the pre-boot machine readable code instruction is accessible by the BIOS; and the hardware processor to reboot and to execute machine readable code instructions of the BIOS to direct execution of the pre-boot machine readable code instructions of the capability-with-reboot included for initialization of the secure hardware component identified within the best match capability-with-reboot responsive to the user query input.

2. The information handling system of claim 1, wherein the best match capability-with-reboot includes initialization of an external communication port that is securely managed by the enterprise management system and execution of capability functions of the best match capability-with-reboot at the external communication port.

3. The information handling system of claim 1, wherein the best match capability-with-reboot includes initialization of the secure hardware component for a set duration of time following initialization.

4. The information handling system of claim 1, wherein the best match capability-with-reboot includes initialization of the secure hardware component for a set number of reboots of the information handling system.

5. The information handling system of claim 1 further comprising:

the hardware processor executing machine readable code instructions of a pre-boot script authorization system of the OTB AI productivity tool to determine the best match capability-with-reboot requires internet technology decision maker (ITDM) authorization for execution of pre-boot machine readable code instructions for initialization of a secure hardware component received from the enterprise management system because the secure hardware component for capability functions of the best match capability-with-reboot is identified in metadata as securely managed by the enterprise management system.

6. The information handling system of claim 1 further comprising:

the network interface device to transmit the pre-boot machine readable code instructions of the capability-with-reboot and receiving an authorized and encrypted pre-boot machine readable code instructions with authorization for initialization of the secure hardware component; and the hardware processor to execute machine readable code instructions of the BIOS after reboot to decrypt the authorized and encrypted pre-boot machine readable code instructions of the capability-with-reboot for initialization of the secure hardware component using a pre-stored public key.

7. The information handling system of claim 1 further comprising:

the hardware processor executing machine readable code instructions for a pre-boot script authorization system of the OTB AI productivity tool to attach platform-specific credentials in metadata to the pre-boot machine readable code instructions for the best match capability-with-reboot; and the hardware processor to execute machine readable code instructions of the BIOS to direct execution of the pre-boot machine readable code instructions for the best match capability-with-reboot if the platform-specific credentials currently identify the information handling system.

8. A method of executing machine readable code instructions for an on the box (OTB) artificial intelligence (AI) productivity tool for responsive capabilities during a reboot of an information handling system as managed by an enterprise management system comprising:

generating, via a hardware processor executing machine readable code instructions, vectorized capability intent values from natural language descriptions of firmware or hardware capabilities, wherein the firmware or hardware capabilities include a capability-with-reboot, and generating a vectorized query input intent value for a user query input received via the OTB AI productivity tool of the information handling system;

performing, via the hardware processor executing machine readable code instructions, a semantic similarity search by comparing the query input intent value to the capability intent values to identify a best match capability-with-reboot for the received user query input, wherein the best match capability with-reboot has a capability intent value that generates a threshold level semantic similarity search score and requiring execution of pre-boot machine readable code instructions for capability-with-reboot with authorization received from the enterprise management system;

transmitting, via a network interface device, the pre-boot machine readable code instructions for the best match capability-with-reboot to the enterprise management system and receiving an authorized and encrypted pre-boot machine readable code instructions with authorization for the best match capability-with-reboot;

storing, via the hardware processor executing machine readable code instructions, the received authorized and encrypted pre-boot machine readable code instructions for the best match capability-with-reboot in a pre-boot memory partition accessible by a basic input/output system (BIOS); and decrypting, via the hardware processor to execute machine readable code instructions of the BIOS, the authorized and encrypted pre-boot machine readable code instructions for execution of the best match capability-with-reboot using a pre-stored public key; and directing execution of the pre-boot machine readable code instructions for the best match capability-with-reboot.

9. The method of claim 8, wherein the best match capability-with-reboot includes initialization of a secure hardware component accessed via BIOS that is securely managed by the enterprise management system.

10. The method of claim 8, wherein the best match capability-with-reboot includes initialization of a secure hardware component accessed via BIOS user identification sensor that is securely managed by the enterprise management system to disable the secure hardware component.

11. The method of claim 8, wherein the best match capability-with-reboot includes initialization of the secure hardware component for execution of a set of limited capability functions following initialization.

12. The method of claim 8, wherein the best match capability-with-reboot includes initialization of a secure hardware component for a set number of reboots of the information handling system.

13. The method of claim 8 further comprising:

the hardware processor executing machine readable code instructions of a pre-boot script authorization system of the OTB AI productivity tool to determine the best match capability-with-reboot requires information technology decision maker (ITDM) authorization for execution of pre-boot machine readable code instructions for the best match capability-with-reboot received from the enterprise management system based on metadata indicating a authorization requirement for the best match capability-with-reboot.

14. The method of claim 8 further comprising:

attaching, via the hardware processor executing machine readable code instructions for a pre-boot authorization system of the OTB AI productivity tool, platform-specific credentials to the pre-boot machine readable code instructions for the best match capability-with-reboot; and directing execution of the pre-boot machine readable code instructions for the best match capability-with-reboot if the platform-specific credentials currently identify the information handling system executing the best match capability-with-reboot.

15. An information handling system managed by an enterprise management system operating an on the box (OTB) artificial intelligence (AI) productivity tool comprising:

a hardware processor executing machine readable code instructions to generate vectorized capability intent values from natural language descriptions of firmware or hardware capabilities, wherein the firmware or hardware capabilities include a capability-with-reboot, and to generate a vectorized query input intent value for a user query input received via the OTB AI productivity tool;

the hardware processor executing machine readable code instructions to perform a semantic similarity search by comparing the query input intent value to the capability intent values to identify a best match capability-with-reboot for the received user query input, wherein the best match capability-with-reboot has a capability intent value that generates a threshold level semantic similarity search score and requiring reboot to basic input/output system (BIOS) and authorization received from an enterprise management system;

the hardware processor executing machine readable code instructions of a pre-boot script authorization system of the OTB AI productivity tool to attach platform-specific credentials to pre-boot machine readable code instructions for the best match capability-with-reboot;

a network interface device to transmit pre-boot machine readable code instructions for the best match capability-with-reboot with platform-specific credentials to the enterprise management system and receive an authorized and encrypted pre-boot machine readable code instructions for the best match capability-with-reboot;

the hardware processor executing machine readable code instructions to store the received authorized and encrypted pre-boot machine readable code instructions for the best match capability-with-reboot in a pre-boot memory partition accessible by the BIOS; and the hardware processor to execute machine readable code instructions of the BIOS to direct execution of the pre-boot machine readable code instructions for the best match capability-with-reboot when the platform-specific credentials currently identify the information handling system.

16. The information handling system of claim 15, wherein the best match capability-with-reboot includes initialization of a secure hardware component accessed via BIOS that is securely managed by the enterprise management system.

17. The information handling system of claim 15, wherein the best match capability-with-reboot includes initialization of a secure hardware component for execution of limited set capability functions following initialization.

18. The information handling system of claim 15, wherein the best match capability-with-reboot includes initialization of a secure hardware component for a set number of reboots of the information handling system for execution of capability functions of the best match capability-with-reboot.

19. The information handling system of claim 15 further comprising:

the hardware processor executing machine readable code instructions for the pre-boot script authorization system of the OTB AI productivity tool to determine the best match capability-with-reboot requires information technology decision maker (ITDM) authorization for execution of pre-boot machine readable code instructions for the best match capability-with-reboot that is securely managed by the enterprise management system.

20. The information handling system of claim 15 further comprising:

the hardware processor to execute machine readable code instructions of the BIOS to decrypt the authorized and encrypted pre-boot machine readable code instructions for capability-with-reboot using a pre-stored BIOS public key.

* * * * *